United States Patent
Yates et al.

[19]

[11] Patent Number: 6,167,438
[45] Date of Patent: Dec. 26, 2000

[54] METHOD AND SYSTEM FOR DISTRIBUTED CACHING, PREFETCHING AND REPLICATION

[75] Inventors: David J. Yates, Norwood; Abdelsalam A. Heddaya, Waltham; Sulaiman A. Mirdad, Quincy, all of Mass.

[73] Assignee: Trustees of Boston University, Boston, Mass.

[21] Appl. No.: 08/861,934

[22] Filed: May 22, 1997

[51] Int. Cl.[7] .................................................. G06F 12/00
[52] U.S. Cl. ........................ 709/216; 709/223; 709/217; 711/118
[58] Field of Search .................................... 711/122, 113, 711/118, 130; 709/216, 203, 217, 223

[56] References Cited

U.S. PATENT DOCUMENTS

| | | | |
|---|---|---|---|
| 5,852,717 | 12/1998 | Bhide et al. | 709/203 |
| 5,864,852 | 1/1999 | Luotonen | 707/10 |
| 5,896,506 | 4/1999 | Ali et al. | 709/213 |
| 5,924,116 | 7/1999 | Aggarwal et al. | 711/122 |
| 5,931,912 | 8/1999 | Wu et al. | 709/224 |
| 5,935,207 | 8/1999 | Logue | 709/219 |
| 5,940,594 | 8/1999 | Ali et al. | 709/203 |
| 5,941,988 | 8/1999 | Bhagwat et al. | 713/201 |

FOREIGN PATENT DOCUMENTS

93/24890  12/1993  WIPO.

OTHER PUBLICATIONS

Heddaya, Abdelsalam and Mirdad, Sulaiman "Wave:Wide–Area Virtual Environment for Distributing Published Documents"*ACM SIGCOMM Workshop on Middleware, Cambridge, MA*, Aug. 28–29 (1995).

Heddaya, Abdelsalam and Mirdad, Sulaiman "WebWave: Globally Load Balanced Fully Distributed Caching of Hot Published Documents" *Boston University, Computer Science Department, BU–CS–96–024, Abstract*, (Oct. 15, 1996).

Heddaya, Abdelsalam, et al. "Diffusion–based Caching Along Routing Paths" *Boston University, Computer Science Department Abstract*, (Apr. 30, 1997).

Chankhunthod, Anawat, et al. "A Hierarchical Internet Object Cache" *Proc. USENIX* (1996).

Cormack, Andrew "Web Caching" *Survey from UK National Cache Project*, (Sep., 1996).

Fielding, R., et al. "Hypertext Transfer Protocol—HTTP/1.1" *Standards Track*, 1–94 (Jan., 1997).

"A Distributed Testbed for National Information Provisioning" *NLANR* (1996).

"Netscape Proxy Server" *Netscape Server Central* (1997).

"Squid Internet Object Cache" *features.html by Danial O'Callaghan <danny@hilink.com.au>*.

C. Mic Bowman et al, Harvest: a scalable, customizable discovery and access system Mar. 1995.

Marc Abrams et al, Caching Proxies: Limitations and Potentials Oct. 1995.

(List continued on next page.)

*Primary Examiner*—Glenton B. Burgess
*Assistant Examiner*—Abdullahi E. Salad
*Attorney, Agent, or Firm*—Hamilton, Brook, Smith & Reynolds, P.C.

[57] ABSTRACT

A technique for automatic, transparent, distributed, scalable and robust caching, prefetching, and replication in a computer network that request messages for a particular document follow paths from the clients to a home server that form a routing graph. Client request messages are routed up the graph towards the home server as would normally occur in the absence of caching. However, cache servers are located along the route, and may intercept requests if they can be serviced. In order to be able to service requests in this manner without departing from standard network protocols, the cache server needs to be able to insert a packet filter into the router associated with it, and needs also to proxy for the home server from the perspective of the client. Cache servers may cooperate to service client requests by caching and discarding documents based on its local load, the load on its neighboring caches, attached communication path load, and on document popularity. The cache servers can also implement security schemes and other document transformation features.

75 Claims, 10 Drawing Sheets

OTHER PUBLICATIONS

Heddaya, A., et al., "WebWave: Globally Load Balanced fully distributed Caching of Hot Published Documents," Technical Report BU–CS–96–024, Boston University, CS Department, (10/96), downloaded from Internet at: http://www.cs.bu.edu/techreports/abstracts/96–024.

Heddaya, A., et al., "WebWave: Globally Load Balanced Fully Distributed Caching of Hot Published Documents," *Proceedings of the 17th International Conference on Distributed Computing Systems* (Cat. No. 97CB36053), Proceedings of 17th International Conference on Distributed Computing Systems, Baltimore, MD, pp. 160–168 (May 27–30, 1997).

Shrikumar, H., et al., "Thinternet: life at the end of a tether," *Computer Networks and ISDN Systems*, 27 (3):375–385 (Dec. 1994).

Bolot, J., et al., "Performance engineering of the World Wide Web: Application to dimensioning and cache design," *Computer Networks and ISDN Systems*, 28(11):1397–1405 (May 1996).

Braun, H., et al., "Web traffic characterization: an assessment of the impact of caching documents from NCSA's web server," *Computer Networks and ISDN Systems*, 28(1):37–51 (Dec. 1995).

METHOD AND SYSTEM FOR DISTRIBUTED CACHING, PREFETCHING AND REPLICATION

BACKGROUND

Computer networks, such as the Internet, private intranets, extranets, and virtual private networks, are increasingly being used for a variety of endeavors including the storage and retrieval of information, communication, electronic commerce, entertainment, and other applications. In these networks certain computers, known as servers, are used to store and supply information. One type of server, known as a host or home server, provides access to information such as data or programs stored in various computer file formats but generically referred to herein as a "document". While in the Internet the documents are typically primarily composed of text and graphics, each such document can actually be a highly formatted computer file containing data structures that are a repository for a variety of information including text, tables, graphic images, sounds, motion pictures, animations, computer program code, and/or many other types of digitized information.

Other computers in the network, known as clients, allow a user to access a document by requesting that a copy be sent by the home server over the network to the client. In order for a client to obtain information from a home server, each document typically has an address by which it can be referenced. For example, in the context of the Internet and within the communication protocol known as Hyper Text Transfer Protocol (HTTP), the address is typically an alpha-numeric string, known as a Uniform Resource Locator (URL), that specifies (a) an address of the home server from which to obtain the information in the form of a name or a numerical address, and (b) a local information text string that identifies the information requested by the client, which may be a file name, a search request, or other identification.

After the user specifies a URL to the client computer, the address portion of the URL is sent over the network to a naming service such as the Domain Name Service (DNS) in order to obtain instructions for how to establish a connection with the correct home server. Once the connection with the server is established, the client can then retrieve the desired document by passing the local information text string over the network directly to the home server. The server then retrieves the document from its local disk or memory storage and transmits the document over the network to the client. The network connection between the home server and the client is then terminated.

Computer and network industry analysts and experts are presently quite concerned that traffic on the Internet is becoming so heavy that the very nature of the way in which it is possible to use the Internet may change. In particular, many individuals now believe that the Internet is intolerably slow and is no longer a reliable entity for the exchange of information in a timely fashion.

The present bottlenecks are no doubt the result of exponential increases in the number of users as well as in the number of complex documents such as multimedia files being sent. It might appear that the answer is simply to add more bandwidth to the physical connections between servers and clients. This will come, however, only at the expense of installing high bandwidth interconnection hardware, such as coaxial or fiber optic cable and associated modems and the like, into homes and neighborhoods around the world.

Furthermore, added bandwidth by itself perhaps would not guarantee that performance would improve. In particular, large multimedia files such as for video entertainment would still potentially displace higher priority types of data, such as corporate E-mails. Unfortunately, bandwidth allocation schemes are difficult to implement, short of modifying existing network communication protocols. The communication technology used on the Internet, called TCP/IP, is a simple, elegant protocol that allows people running many different types of computers such as Apple Macintoshes, IBM-compatible PCs, and UNIX workstations to share data. While there are ambitious proposals to extend the TCP/IP protocol so that the address can include information about packet content, these proposals are technologically complex and would require coordination between operators of many thousands of computer networks. To expect that modifications will be made to existing TCP/IP protocols is thus perhaps unrealistic.

An approach taken by some has been to recognize that the rapidly growing use of the Internet will continue to outstrip server capacity as well as the bandwidth capacity of the communication media. These schemes begin with the premise that the basic client-server model (where clients connect directly to home servers) is wasteful of resources, especially for information which needs to be distributed widely from a single home server to many clients. There are indeed, many examples of where Internet servers have simply failed because of their inability to cope with the unexpected demand placed upon them.

To alleviate the demand on home servers, large central document caches may be used. Caches are an attempt to reduce the waste of repeated requests for the same document from many clients to a particular home server. By intercepting parallel requests, a cache can be used to serve copies of the same document to multiple client locations.

From the client's point of view, the interaction with a cache typically occurs in a manner which is transparent to the user, but which is slightly different from a network messaging standpoint. The difference is that when the address portion of the request is submitted to the Domain Name Service (DNS) to look up the information needed to connect to the home server, the DNS has been programmed to return the address of a cache instead of the actual original home server.

Alternatively, a server node, acting as a proxy for the client, may issue probe messages to search for a cache copy. Once a cache copy is found at a particular node in the network, the request is then forwarded to that node. For example, under the auspices of the National Science Foundation, document caches have been placed at various locations in the United States in order to eliminate bottlenecks at cross-oceanic network connections. Generally, certain of these caches located on the West Coast handle requests for documents from the Asia-Pacific and South American countries, and a number of those located on the East Coast handle requests for documents from Europe. Other of these national caches handle requests for popular documents located throughout the United States.

However, such caching techniques do not necessarily or even typically achieve optimum distribution of document request loading. In particular, in order for the caches to be most effective, the DNS name service or other message routing mechanism must be appropriately modified to intercept requests for documents for which the expected popularity is high. The introduction of cache copies thus increases the communication overhead of name resolution, because of the need to locate the transient copies. The name service must register these copies as they come into existence, disseminate this information to distribute demand for the documents, and ensure the timely removal of records for deleted cache copies. Often times, the cache lookup order is fixed, and/or changes in document distribution must be implemented by human intervention.

Unfortunately, frequent and pronounced changes in request patterns can force the identity, location, and even the number, of cache copies to be highly transient. The resulting need for updating of cache directories means that they cannot typically be replicated efficiently on a large scale, which can thus turn the name service itself into a bottleneck.

Another possible approach to implementing caches is to change the client/server interaction protocol so that clients proactively identify suitable cache copies using a fully distributed protocol, for example, by issuing probes in randomized directions. Aside from the complexity of modifying existing protocols and message cost introduced by such an approach, such a scheme also adds one or more round trip delays to the total document service latency perceived by the client.

SUMMARY OF THE INVENTION

The present invention is an automatic, distributed, and transparent caching scheme that exploits the fact that the paths that document requests follow through a computer network from a client to a particular document on a particular home server naturally form a routing graph, or tree.

According to the invention, cache servers are placed throughout the network, such that if a document request can be fulfilled at some intermediate node along the routing graph, it will be serviced by the intermediate node returning the cached document to the client. The document request messages are thus responded to before they ever reach the home server. Since document request messages are permitted to be routed from clients in the direction of the home server up the routing graph in the same manner as would occur in the absence of caching, naming services do not need modification.

In order to be able to service requests in this manner without departing from standard network protocols, a cache server includes a packet filter in its associated router. The filter extracts document request packets that are highly likely to hit in the associated cache.

The cache server also preferably acts as a communication protocol proxy for the home server. That is, as part of fulfilling document request messages at the intermediate node locations, the client is sent appropriate messages, depending upon the communication protocol in use, to spoof the client into believing that the document was actually received from the home server.

The invention also provides a manner in which caching servers may cooperate to service client requests. In particular, each server has the ability to cache and discard documents based on its local load, the load on its neighboring caches, adjacent communication path load, and on document popularity. For example, each server maintains an estimate of the load at its neighbors, and communicates its own load estimate to neighboring cache servers. If a cache server notices that it is overloaded with respect to any of its neighbors, it offloads or transfers a fraction of its work to its under loaded neighbors. To do so, a cache server also preferably learns the identity of its neighboring upstream (or parent)and downstream (or child) nodes on the routing graph that is rooted at a given home server.

There are several advantages to the basic concepts of a document caching system according to the invention.

First, the approach does not need to request an address lookup from a cache directory, to redirect document requests, or to otherwise probe other elements of the network to locate cache copies. Location of the cache copy thus occurs fortuitously, along the natural path that the request message follows anyway. The client thus does not experience delays or bottlenecks associated with waiting for other entities in the network to find appropriate cache copies.

In addition, the system as a whole permits cache copies of documents to diffuse through the network as needed, which in turn diffuses bottlenecks at the caches and well as along the communication paths.

There is also a corresponding reduction in network bandwidth consumption and response time, because cache copies are always placed nearer to the original server than to the client, Document request messages and the documents themselves therefore typically do not need to travel the full distance between the server and each client every time they are requested. Hence, overall network bandwidth is conserved, response times are reduced, and load is more globally balanced.

The invention thus not only helps to dampen differences in the load demand on the host servers, but also reduces the load on network communication resources, without requiring any modification to existing network protocols.

Furthermore, because cache copies are distributed through the network, there is no single expected point of failure of the caching system, and the system is robust and fail-safe.

The technique is also scalable, in the sense that as more cache servers are added, both clients and servers experience a likewise benefit.

The invention can be used to implement additional functionality in a network. These various functions are a direct result of the fact that the packet filter implemented at the router associated with the cache servers can also do more than simply divert requests for copies of documents to the local cache.

For example, popularity statistics are of necessity collected by the cache servers, in order to control the choice of what documents to cache. Each cache server thus keeps track of how many references to a particular document are received and from where they are received and can determine aggregate request amounts and request rates. This data can be collected at a central location, such as by network region, so it is then possible for a publisher of documents to not only obtain statistics about the hit rate on their material but also where in the network the hits are coming from. This is important not only for document popularity analysis, but also electronic commerce and intellectual property tracking.

The cache servers can also be used to host replicas of popular documents such as databases, search engine index files, and the like, by acting as load splitters from the service provider perspective. In other words, database providers can arrange to have their documents placed into the network, pushing out data closer to the clients that desire access to it, wherever the best placements might be.

A set of security features may also be readily attached to the cache servers.

One such feature is the authentication of the sources of request messages and other information. This is possible because the cache servers maintain information as to the physical source of document request messages and of the documents themselves. The mechanism also arises from the fact that the nodes have a filter and a packet router. The filter and packet router may be used not only to keep track of how to redirect requests to cache copies, but also to restrict access to the cache copies, such as by authenticating the request for the information. The invention also enables various types of document distribution in a the network. For example, the invention permits document compression, which is another form of conserving bandwidth, or encryption, as long as a particular server and client node are committed to communicating by using cache servers, e.g., the first and last nodes along the path between the client and the server in the network contain cache servers.

The invention also permits the efficient caching of dynamic content documents. Such dynamic content documents are of the type where what is to be returned to the client changes on the fly, typically in accordance with program instructions. When the invention recognizes the existence of dynamic content documents in its cache, it caches not only the data for the document, but also allows for fetching and executing of programs that specify how the document is to be displayed or when the data is retrieved.

The invention also improves the delivery of stored continuous media such as audio and video data files since the number of network nodes between a server and a client are reduced.

BRIEF DESCRIPTION OF THE DRAWINGS

For a more complete understanding of the advantages provided by the invention, reference should be had to the following detailed description together with the accompanying drawings, in which.

DETAILED DESCRIPTION OF PREFERRED EMBODIMENTS

1. Introduction

Figure 1:
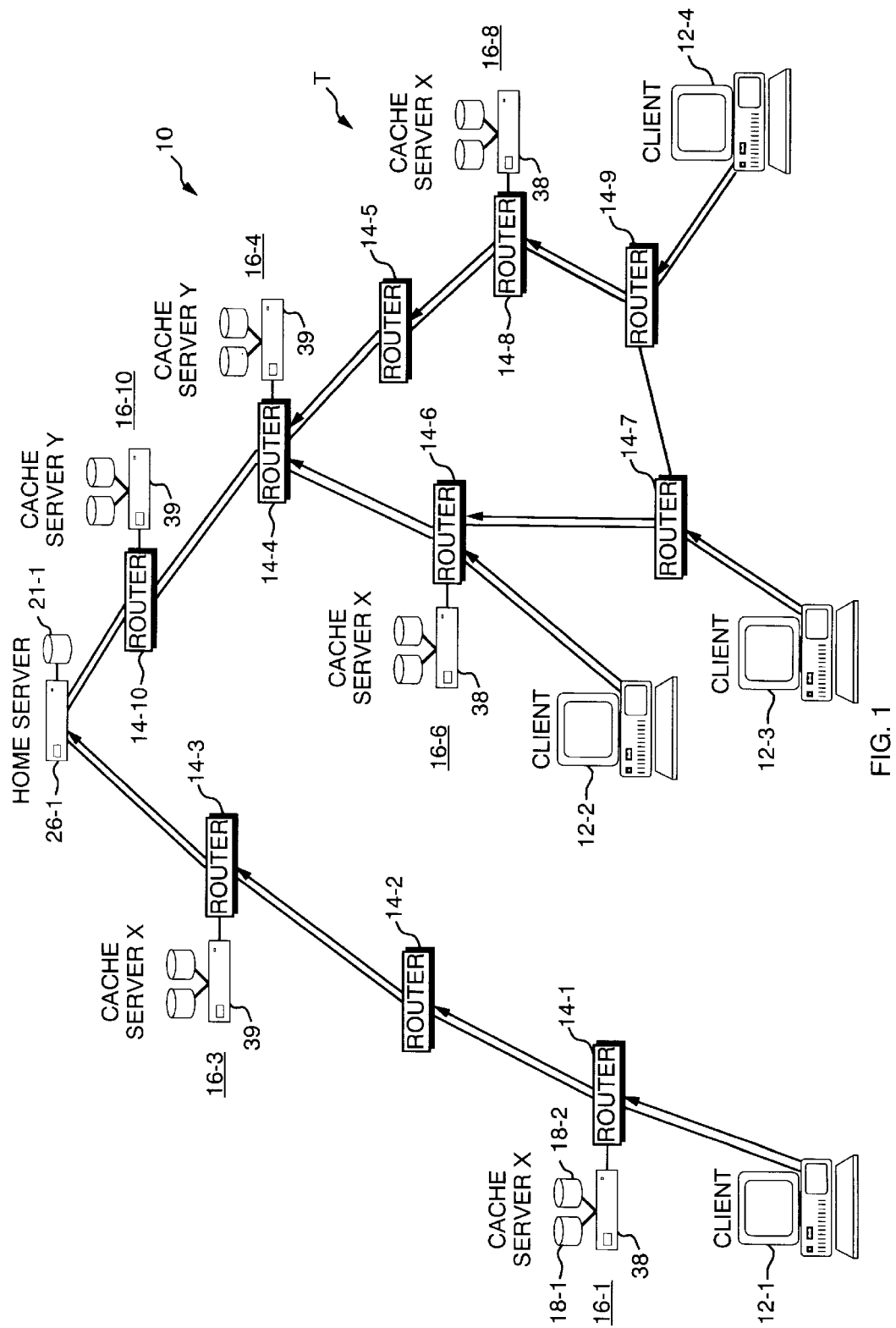
FIG. 1 depicts a typical computer network showing a request path for a single document and the location of cache servers along the path according to the invention.

Turning attention now to FIG. 1, a computer network 10 such as the Internet, extranet, private intranet, virtual private network, local area network, or any other type of computer network consists of a number of network entities including client computers 12-1, 12-2, 12-3, 12-4 (collectively, clients 12), routers 14-1, 14-2, . . . , 14-10, cache servers 16-1, 16-3, 16-4, 16-6, 16-8, and 16-10, and home server 20. The network may make use of any and various types of physical layer signal transmission media such as public and private telephone wires, microwave links, cellular and wireless, satellite links, and other types of data transmission.

In the illustrated network, certain routers 14 have associated with them cache servers 16, whereas other routers do not have associated cache servers. The cache servers 16 include various types of storage for documents in the form of a cache storage 18-1 which may include disk storage 18-1-1 and/or memory storage 18-1-2.

The clients 12 and home server 20 operate as in the prior art to permit distribution of a wide variety of information, typically in the form of "documents". Such documents may actually contain text, graphics, pictures, audio, video, computer programs and any number of types of information that can be stored in a computer file or parts of a computer file. Furthermore, certain documents may be produced at the time that access is requested to them, by executing a program.

It will be assumed in the following discussion that the network 10 is the Internet, that the information is encoded in the form of the Hyper Text Transfer Protocol (HTTP) documents, and that document request messages are sent in the form of Uniform Resource Locators (URLs) using the TCP/IP layered protocol. This is with the understanding that other types of wired, switched, and wireless networks, and other types of protocols such as FTP, Gopher, SMTP, NNTP, etc. may make advantageous use of the invention. In addition, although the invention is discussed in the context of a client-server type of communication model, it should be understood that the principals of the invention are equally applicable to peer-to-peer networks.

A request message for a particular document, for example, originates at one of the client computers, such as client 12-1. The message is a request by the client 12 for the home server 20 to send a copy of document that is presently stored at the home server 20 location such as on a disk. The document request message is passed through one or more routers 14, such as routers 14-1, 14-2, 14-3, in the direction of the illustrated arrows, on its way to the home server 20.

In networks such as the Internet, document request messages may pass through as many as fifteen or more nodes or "hops" through routers 14 before reaching their intended destination. Requests for the same document from other clients, such as clients 12-2, 12-3, or 12-4 also pass through different routers 14 on their way to the home server 20 at the same time.

It should also be understood that although the routers 14 and cache servers 16 are shown as separate elements in FIG. 1, that their functionality may be combined into a single element.

A model is useful for understanding the nature of how requests from multiple clients for one particular document travel across a path the computer network 10. The model is that structure, T, which is induced by the effect of routing algorithm on the document request messages as they travel through the network to the home server 20. As shown in FIG. 1, the home server 20 can thus be thought of as being at the root node of the structure, T, with document requests originating at the leaf node levels farthest away from the root, namely at clients 12-1, 12-2, . . . , 12-4. The structure T also includes many intermediate nodes which are located the routers 14.

While the structure T of the set of paths that client requests follow towards a given home server 20 is accurately and generally described as a data directed, acyclic graph, the present exposition does not benefit from the added complexity. In particular, when a single particular document is considered as being located at only one home server, the structure can be referred to as a tree with a single root. With that understanding we use the term tree to describe the structure Therein, with the understanding that a graph model may also be used. With this model in mind, the entire Internet can be thought of as a forest of trees or graphs, each rooted at a different home server 20 which is responsible for providing an authoritative permanent copy of some set of documents.

In accordance with the invention, copies of documents are located in the network at cache servers 16. According to the invention, the placement of cache copies, and hence the diffusion of load, is constrained to nodes in the tree structure, T. This avoids the need for clients to lookup the locations of cache copies, either by directly contacting the home server 20, or a naming service such as a Domain Name Service (DNS), or by probing the network in search of apropriate cache copies.

The present invention also assumes that cache servers 16 lie on the path along the tree that document request messages would naturally take from the client 12 to the home server 20, with the cache servers 16 cooperating to off-load excess load at the home server 20, or to diffuse other potential performance bottlenecks such as communication links themselves. In effect, the routers 14 having associated cache servers 16 inspect document request message packets as they fly-by and intercept any request for which it may be possible to fulfill by providing a cached document instead.

In a most general description of the operation of the invention, document request messages travel up the tree T, from a client at which it originated, such as client 12-3, towards the home server 20. Certain routers encountered by the document request message along the way, such as router 14-7, do not have local cache servers 16, and thus simply pass the document request message up to Findeathe next router in the tree, such as router 14-6.

However, certain other routers, such as router 14-6, do have a local cache server 16-6, in which case the document request message is examined to determine if it is seeking a document located in the local cache store 18. If a cache copy is encountered at cache server 16-6, then that copy is returned to the client 12, and the request message is not permitted to continue on its way to the home server 20. If however, a cache copy is not encountered at the particular cache server 16-6, the request message continues to the next router 14-4 on the path to the home server 20.

When a request message packet enters a router 14, the router first passes the request message to a portion of its software referred to herein as the filter code. The filter code in the router 14 is updated as necessary by the local cache server 16. The filter code depends on the types of packets, the cache contents, the load at the local cache server 16, or the load on the attached communication links. The filter causes the interception of the packet (for an attempted service by the local cache server 16) or passes the packet back to the router 14 to determine the next hop the packet should take on its way to the home server 20.

Ideally, the implementation of the cache servers 16 is such that no changes are required to the normal operating mode of either clients 12 or servers 20. Another goal is to have a design that can be gradually deployed into the existing infrastructure of the network 10. This also requires that any new mechanisms preferably be compatible with existing communication protocols.

Figure 2:
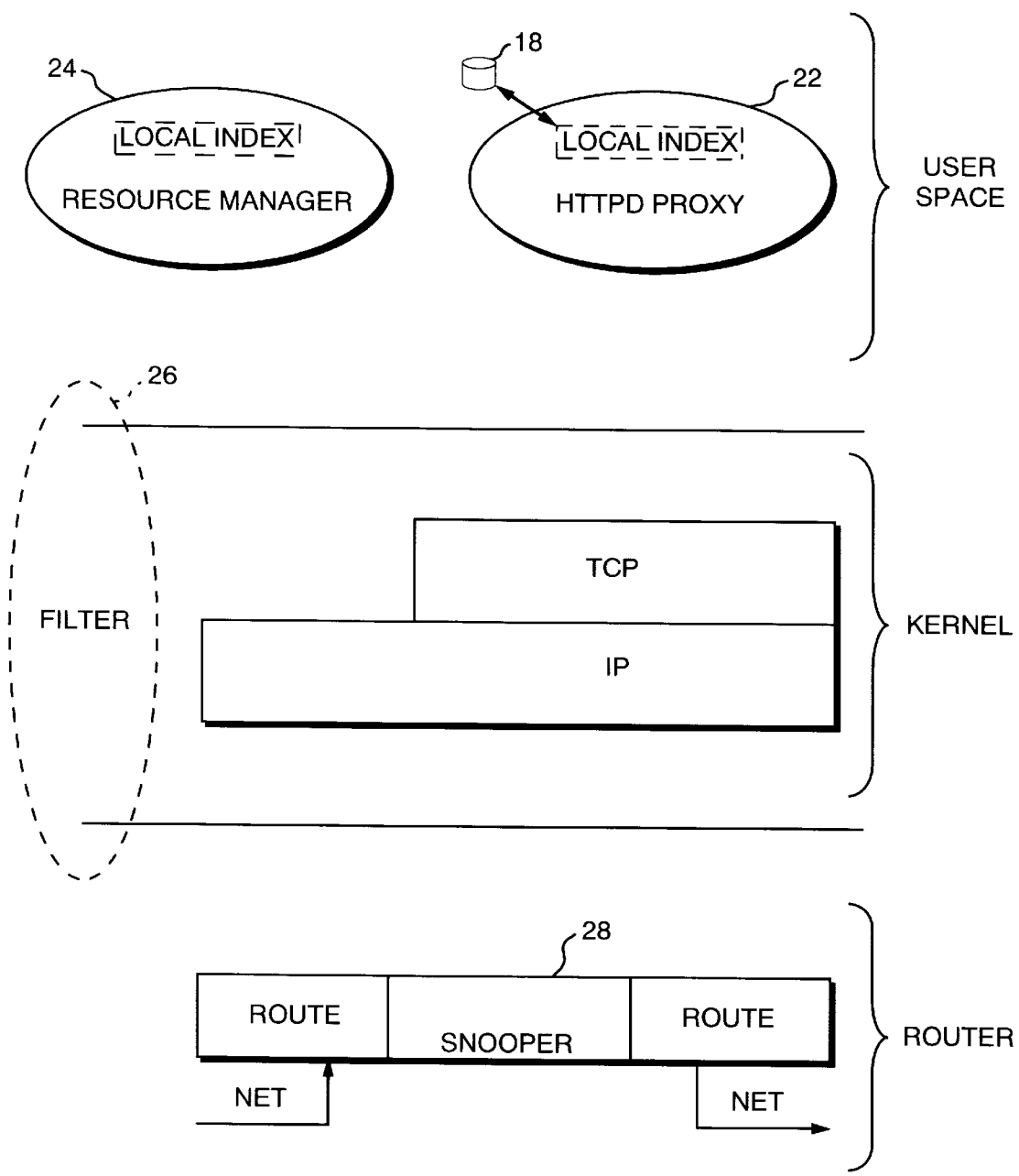
FIG. 2 is a communication layer diagram illustrating how a resource manager, protocol proxy, and snooper are used to implement the invention.

To accomplish this a cache server 16 and associated router 14 preferably consist of four functional building blocks, as shown in the layer diagram of FIG. 2. At a relatively higher layer protocol level, such as the application layer, the cache server 16 includes an HTTP proxy 22 and a resource manager 24. At a lower layer, such as the physical layer, the router typically implements a packet filter 26 and an IP proxy or snooper 28.

The HTTP proxy 22 implements a standard HTTP protocol with responsibilities including storage management and the maintenance of the index structures necessary for accessing cached documents. If the HTTP proxy 22 receives a request for a document not located in the local cache 18, it requests the document from the home server 20 and respond to the request when the document arrives. The HTTP proxy 22 is configured to cache documents only as instructed by the resource manager 24.

While FIG. 2 shows two types of proxying, namely at the HTTP and IP level, it should be understood that the implementation can also include proxying at other layers, including the application layer, IP layer, or some other layer in between, such as a transport, session, presentation, or other layer.

The resource manager 24 implements a protocol to diffuse document copies through the network 10, as will be described in greater detail below. The resource manager 24 is responsible for maintaining state information used by the document load diffusion mechanism. The resource manager may be programmed to not only manage the load on the cache servers 16 themselves, but may also be programmed to manage the traffic on the communication paths used interconnect the routers 14.

To accomplish this load management, or load balancing, the resource manager 24 maintains information about the identity and the load of its neighboring cache servers 30. The details of how neighboring cache server information is maintained is discussed below in Section 3.

In addition, for each document in the cache 18, the resource manager 24 distinguishes between requests received through each of its neighboring cache servers 30. This is done by maintaining a separate hit count for requests received from each neighboring cache server 30. Using such information, the resource manager 24 computes the fraction of excess load to be diffused. Once these fractions are determined, the resource manager 24 informs its under-loaded neighbors 30 which document to cache and the fraction of requests they should undertake. These fractions are also used to generate new filter code to be injected into the associated router 14. A similar process is performed by the under-loaded neighbors 30. If necessary, the resource manager 24 at the under-loaded neighbor 20 informs the attached HTTP proxy 22 to add new documents to its cache 18.

Other responsibilities of the resource manager 24 include neighborhood discovery, propagating load information to the neighboring servers 30, and discovering and recovering from potential barriers to load balancing. These mechanisms are discussed in more detail below.

The routers 14 take an active role in assisting cache servers 16 to achieve cache server and/or communication path balancing goals. This is accomplished by allowing the resource manager 24 to inject functionality into the router 14 in the form of the code that implements the filter 26 and snooper 28. In particular, all packets passing through a router 14 not addressed directly to a host server 20 are first passed to the snooper 28. The snooper 28 inspects a packet and determines its type, destination, and the document requested. Depending on the state of the cache server 16 and packet type, the snooper 28 could intercept the packet or simply forward the packet to the next hop, or router 14, along the intended destination path to the home server 20.

To determine if a requested document is located at the local cache server 16, the snooper 28 queries the filter 26. If the filter 26 indicates that the requested document is cached and can be serviced locally, then the packet is intercepted and passed to the resource manager 24. Otherwise, the packet is passed on to the next hop towards the destination home server 20.

The snooper 28 is typically aware of the TCP protocol and the structure of both TCP and HTTP packets. Another functionality of the snooper 28 is to extract copies of HTTP request packets and pass them up to the resource manager 24. This feature is used to assist the resource manager 24 in discovering its neighborhood and recovering from potential barriers.

2. Handling an HTTP Document Request in a TCP/IP Network Current implementations of networks 10 that use HTTP rely on the layered TCP/IP protocol for reliable end-to-end communication between clients 12 and servers 20. This layering divides the normal processing of a request message into three steps; connection establishment (i.e., TCP-level three way handshake in the form of {SYN} messages), HTTP document request/reply in the form of {GET} messages, and connection termination in the form of {FIN} messages.

Figure 3:
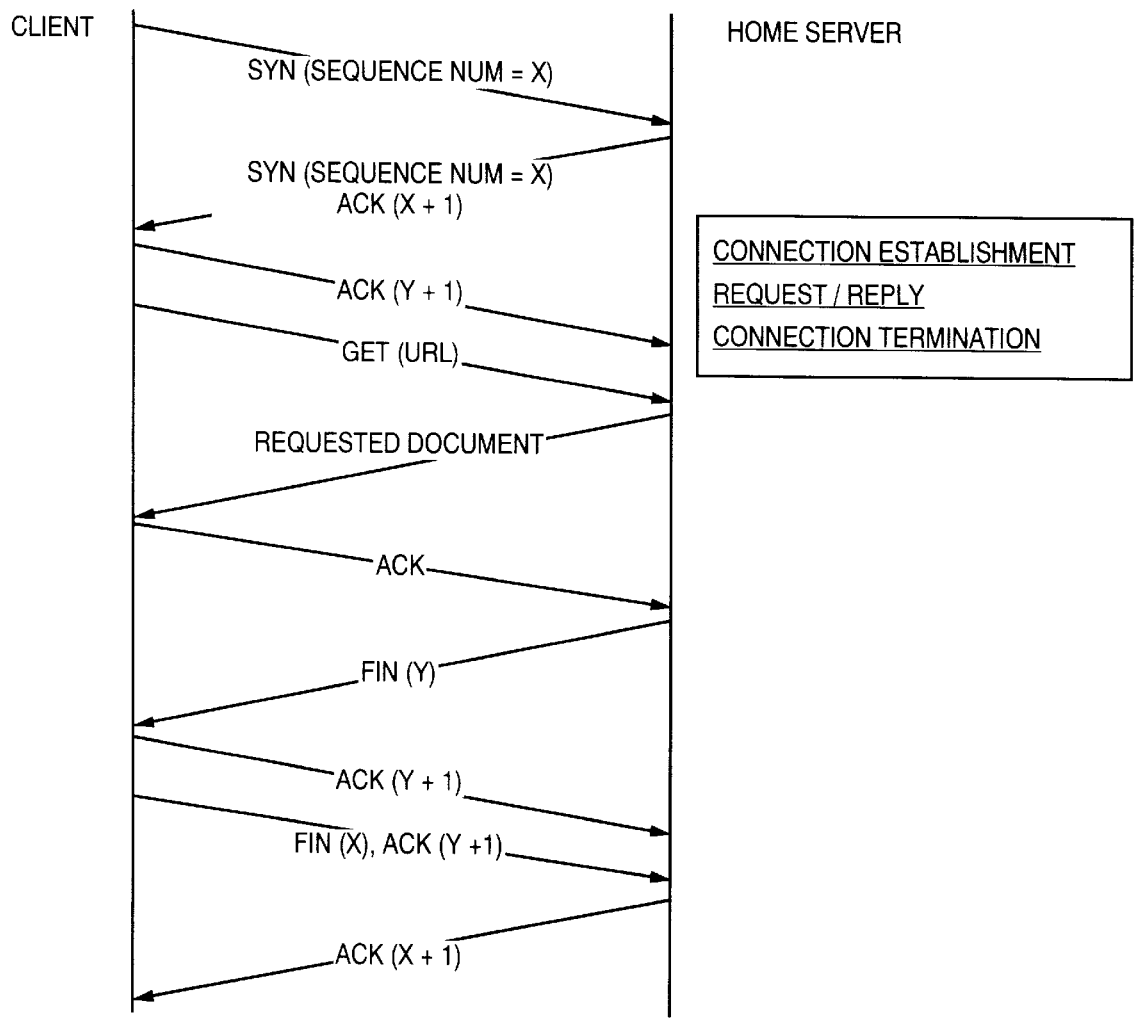
FIG. 3 shows the typical stages in a document request over the network.

This process is depicted in FIG. 3, where the client 12 first issues a {SYN} message with a sequence number to the home server 20, and the home server 20 returns a {SYN} message with an acknowledgment {ACK}. In response to this, the client 12 then sends a document request in the form of a {GET} message that includes the URL of the desired document. The document is then forwarded by the home server 20 to the client 12. After the client 12 returns an acknowledgment, the server 20 and client 12 terminate the connection by exchanging {FIN} and {ACK} messages.

The main hurdle in actually implementing the cache servers 16 as explained above in such an environment is the requirement that they need to identify the document requested by a client 12. However, as seen in FIG. 3 the URL information is typically advertised by an HTTP client 12 only after a TCP/IP connection has already been established with the home server 20. One possible solution would thus be to have all such connections be established with the home server 20 and have snoopers 28 at intermediate routers 14 intercept all {GET} packets. Even though this approach might relieve a significant amount of load from a home server, it still required that TCP connections associated with such documents reach the home server 20, which defeats the purpose of attempting to off-load the home server 20. During high demand periods, such requests would amount to a flood of {SYN} requests on the home server 20. In addition, if the initial {SYN} is not intercepted, both establishing and tear down of connections becomes significantly more complicated.

To overcome this hurdle, in the preferred embodiment, intermediate routers 14 have some awareness of the TCP protocol. TCP aware routers 14 are able to detect TCP connection requests to all HTTP servers (i.e., a {SYN} packet directed to the HTTP port), and have the ability to act as a proxy for, or "spoof" the home server 20.

This functionality is implemented by the snooper 28. In particular, snoopers 28 located in routers 14 on the path to a home server 20 inspect packets that fly-by, identify such packets, and intercept any {SYN} packets directed to HTTP home servers 20. As {SYN} packets do not contain any information identifying which document the client 12 intends to request, the snooper 28 acts as a proxy for, or "spoofs" the home server 20, by establishing a connection between the client 12 and the local transport layer in the cache server 16, and noting the initial sequence numbers used by both the client 12 and the local transport layer.

After the connection is established the snooper 28 inspects all packets that fly-by, and waits for the corresponding {GET} request. Once the {GET} request arrives the snooper 28 queries the local filter 26 and the resource manager 24 to determine if the requested document is cached. If the document is cached the snooper 28 forwards the HTTP {GET} message to the local resource manager 24, waits for the resource manager 24 to service the request, and then terminates the connection. Otherwise, the requested document is not cached (i.e., the filter 26 or resource manager 24 missed). Several different approaches may be taken to servicing the document request at this point.

In a first approach, the TCP connection is handed off, wherein the snooper 28 closes the server half of the spoofed TCP connection with the client 12, and forwards the document request in the form of a composite "piggy back" {SYN+GET} message in the direction of the home server 20. In addition, the {SYN+GET} message contains all the state information needed to hand-off the server half of the TCP connection to any other intermediate cache server on the path to the home server 20 which happens to cache the requested document.

In a second alternative approach, the snooper may act as a TCP relay, maintaining the TCP connection with the client, and relaying the {SYN+GET} message on a separate connection to the next intermediate cache server on the path to the home server 20.

Figure 4:
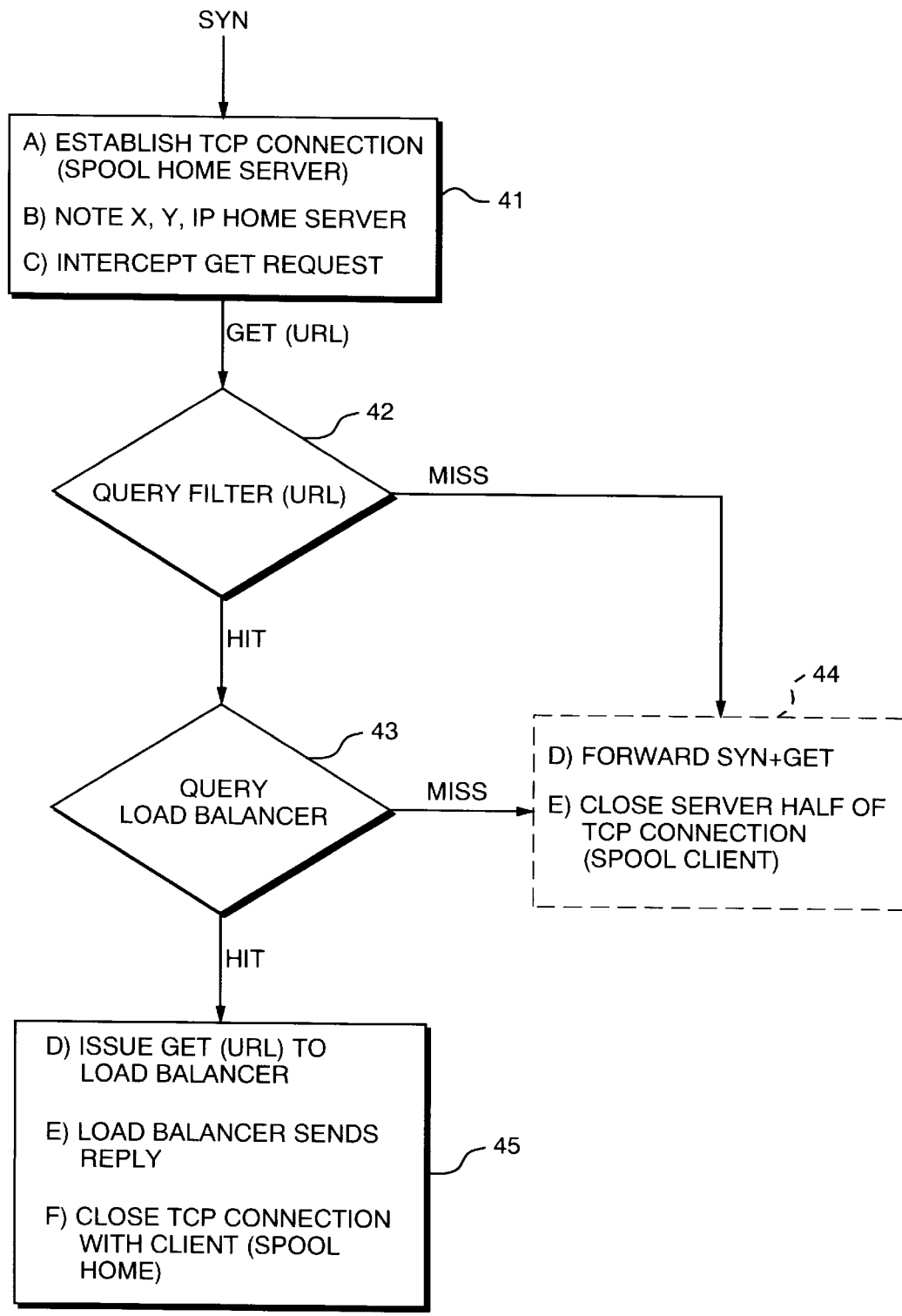
FIG. 4 is a flow chart of the operations performed by a leaf server located on the routing path according to the invention.

The above hand-off process is illustrated in the flow chart of FIG. 4. This process is carried out by a particular class of cache servers 16 referred to as leaf node servers 38, which are the cache servers 16 that are on the extreme lower level nodes of the tree T, i.e., the first servers to intercept a {SYN} packet from a client 12. The leaf node servers 28 in the tree T depicted in FIG. 1 are cache servers 16-1, 16-6, and 16-8.

As shown in step 41 of FIG. 4, when a leaf node server 38 receives a {SYN} packet, the home server 20 is proxied for, or "spoofed", by establishing a TCP connection directly between the leaf node server 38 and the client 12. The leaf node server 38 then waits to intercept the corresponding {GET} request from the client 12.

Note that spoofing thus occurs in the sense that packets exchanged between the client 12 and a cache server 16 are modified by the snooper 28 in the above scenario. In particular, the network address of a cache server 16 which is servicing a request is replaced with the network address of the home server 20 and in a connection hand-off, the sequence numbers of bytes issued by the cache server 16 have to follow the sequence number as determined by the leaf server 38.

Returning to step 41, if the requested document passes the cache query test by the filter 28, and in step 42, and if the resource manager 22 detects that the document is present in the local cache and will permit access to it, then the document request is serviced locally, in step 45. In step 45, the {GET} command is forwarded to the resource manager, which then replies with the requested document. Finally, the TCP connection between the leaf server 38 and the client 12 is closed, by spoofing the home server 20 once again and issuing the closing {FIN} and {ACK} messages to the client.

Otherwise, if there is a miss in step 42 or 43, the snooper 28 forwards a {SYN+GET} packet in the direction of the home server 20, and then closes the server half of the spoofed TCP connection, so that another cache server on the tree may service it if possible. The steps d) and e) in FIG. 4 may be asynchronous events and may typically occur in parallel. The snooper 28 at a leaf server 38 then has to acknowledge the reception of the {GET} request.

In the scenario depicted in FIG. 1, the upstream intermediate non-leaf nodes 39 include those with cache servers 16-3, 16-4, and 16-10. The cache servers 16 located at the non-leaf nodes 39 need to process.{SYN+GET} packets in a slightly different manner. In particular, the snooper 28 in a non-leaf node 39 intercepts {SYN+GET} packets only if the requested document is cached and the local cache server 16 has sufficient capacity to service it.

Figure 5:
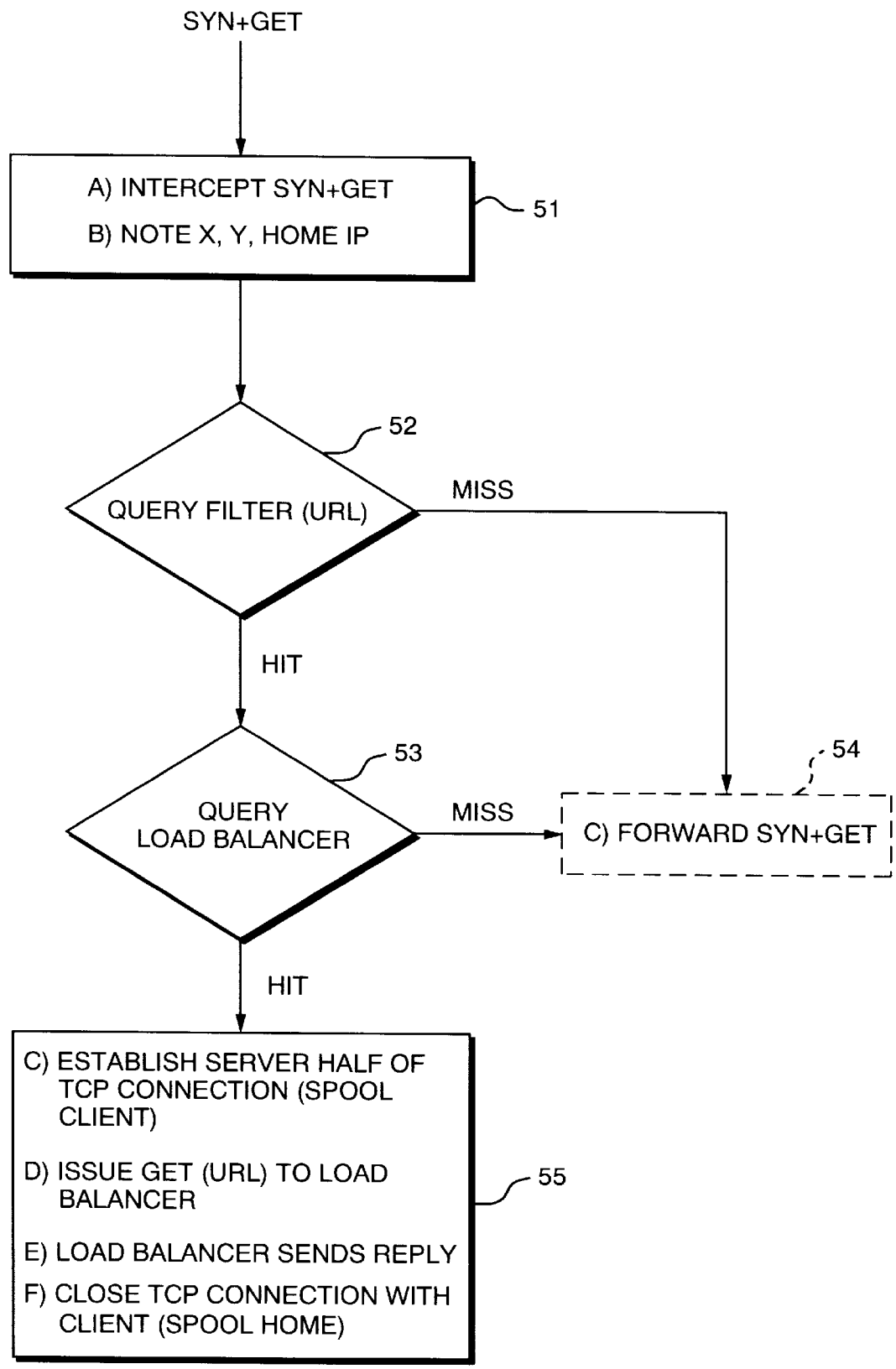
FIG. 5 is a flow chart of the operations performed by a intermediate non-leaf cache server.

FIG. 5 is a detailed flow chart of this process as performed at the non-leaf intermediate nodes 39. As shown in step 51, to service such a request, the snooper 28 first spoofs upon receipt of the {SYN} from the leaf node 38, and intercepts the following {GET} request. In the following steps 52 and 53, queries are made to the filter 26 and resource manager 24 as before, to determine if the {GET} can be processed locally.

If the request can be processed locally, step 55 completes the proxying for the home server 20 by establishing the server half of the TCP connection with the client 12, issuing the {GET} to the resource manager 24, returning the document to the client 12, and closing the TCP connection.

If the {GET} message cannot be processed locally, step 54 is executed, where the {SYN+GET} is forwarded to the next node in the tree T.

The main advantage of processing {SYN+GET} packets differently in the intermediate non-leaf nodes 39 is that a TCP connection is only handed-off once to the particular intermediate node 39 that actually has the requested document. Another advantage is that the {SYN+GET} contains all the state information needed for connection hand-off (i.e., no additional state information is exchanged between the snooper 28 at the leaf node server 38 and that at the intermediate node 39 which is actually caching the requested document.)

One drawback of piggy-backing {SYN+GET} packets in this manner is that home servers 20 will not interpret such packets properly without adapting their transport protocol to deal with such packets. To avoid this problem and ensure inter-operability with current network protocols, an additional precaution can be taken by requiring that the snooper 28 located at the last intermediate node 39 before a home server 20 intercept all {SYN+GET} packets. Thus, when none of the leaf node servers 38 or intermediate node servers 39 cache the requested document, the last intermediate server 39 intercepts the {SYN+GET} and relays an explicit HTTP {GET} request to the home server 20.

Figure 6:
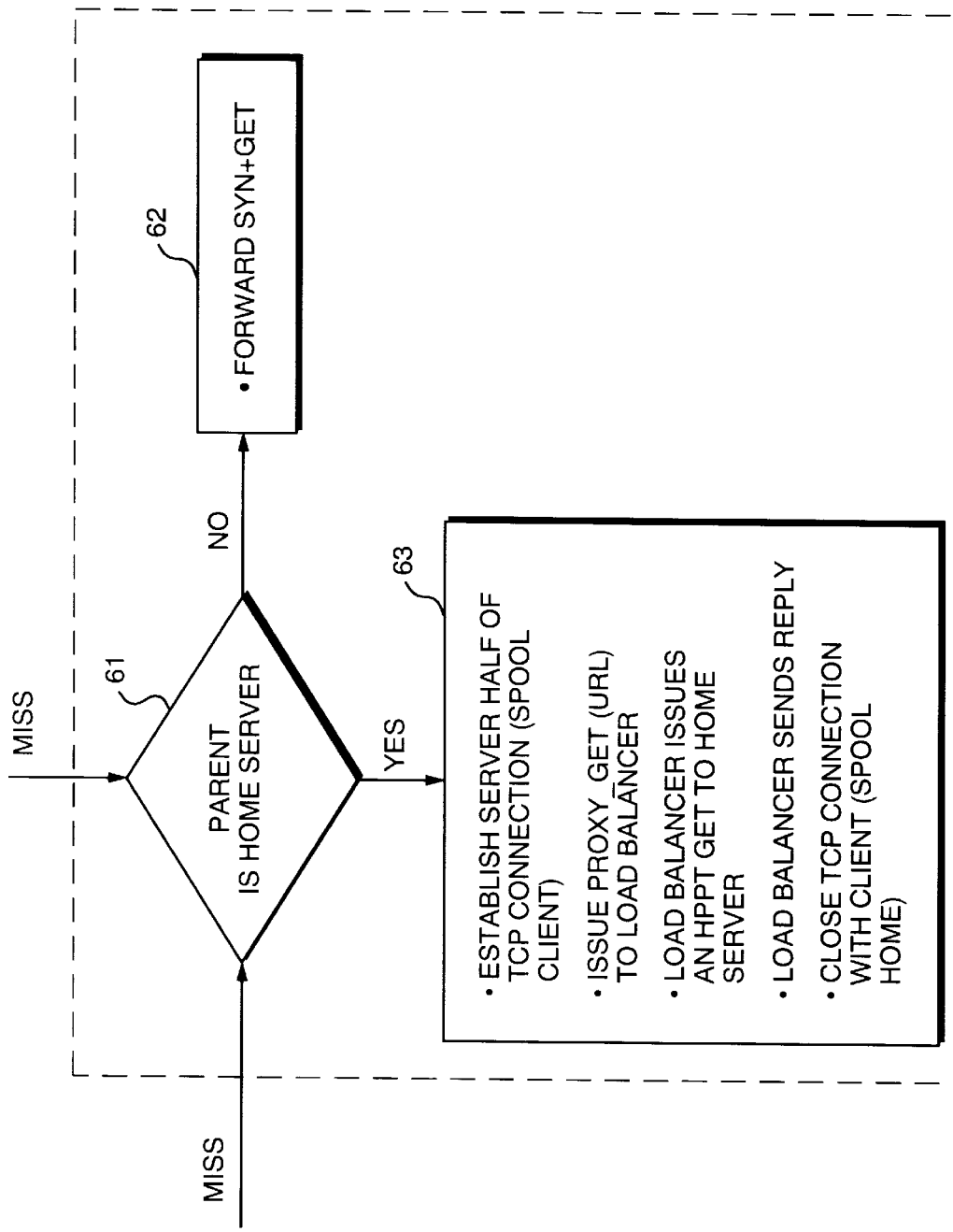
FIG. 6 is a flow chart of the operations performed by a last cache server on the routing path.

To accommodate this case, step 54 of FIG. 5 can be replaced with the processes illustrated in FIG. 6. In this case, in step 61, where the next upstream node along the path, T, (or parent node) is not the home server 20, then step 62 is entered, where the {SYN+GET} is forwarded to the next intermediate node on T.

However, if the next node is a home server 20, then the step 63 is performed. In particular, snooper 28 establishes the server half of the TCP connection with the client 12, and replaces the {SYN+GET} with a {PROXY_GET} request to the local resource manager 24. The resource manager 24 translates the {PROXY_GET} request to an explicit {GET} issued to the home server 20. The response of the home server 20 response is then relayed to the client 12 in the same manner as if the cache server was caching the requested document.

Figure 7:
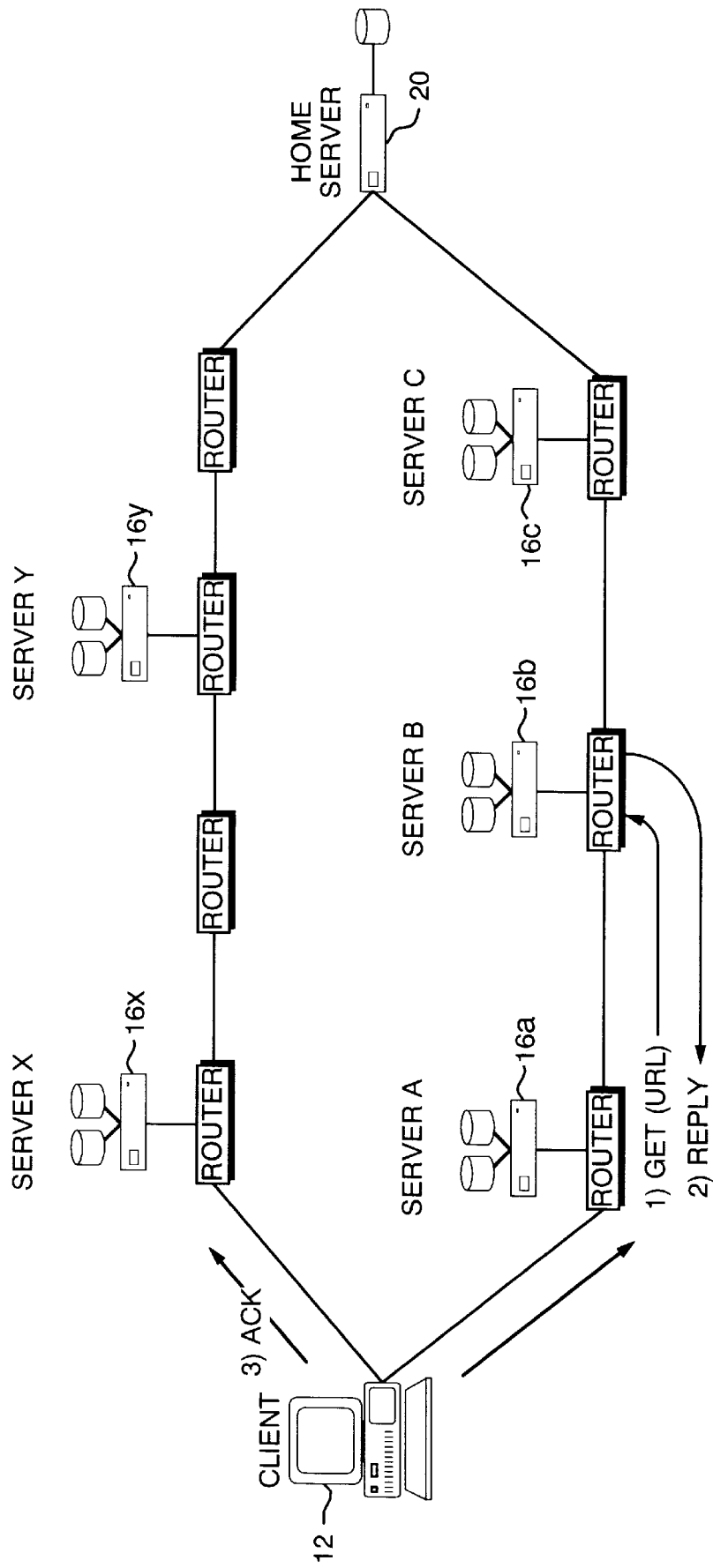
FIG. 7 illustrates the interception of a document request message by an intermediate server.

Another shortcoming of the caching technique described thus far is that the path along the tree T between a particular client 12 and the home server 20 can change after a leaf node server 38 or an intermediate node server 39 decides to service a request. This may occur, for example, when a network connection, or link, is lost between two server nodes. FIG. 7 shows this relatively rare case where the path between the client 12 and the home server 20 changes while an intermediate cache server 16b is processing a document request from client 12. All {ACK}s sent by the client 12 will now follow the new path, through a new cache server 16x, to the home server 20. This causes cache server 16b to time-out and retransmit its packets.

To solve this problem, the snooper 28 at server 16b may keep track of the number of times a packet is re-transmitted. If a packet is re-transmitted more than a predetermined number of times, for example, three times, the snooper 28 then assumes that the path between the client 12 and the home server 20 has changed, and then takes steps to terminate the connection with the client 12. In particular, the snooper 28 aborts the connection with the client 12 and aborts the connection with cache server 16b, simultaneously spoofing the home server 20 and sending a reset packet (i.e., an {RST} packet) to the client 12.

In another approach the leaf node servers 28 closest to the clients 12 and the last hop nodes closest to the server 20 are provided with only one possible route to the clients 12 and servers 20, respectively. This is accomplished by having the cache servers forward client request messages over cache server-to-cache server permanent TCP connections, instead of simply letting the request messages follow their normal routes. The set of connections, being implemented as a set of properly joined TCP connections, thus automatically adapts to any changes in IP routing as the network configuration changes.

3. Neighborhood Discovery

However, any resulting changes in the configuration of adjacent cache servers must also be detected by communication with neighboring cache servers in order to achieve resource load balancing and other advantages possible with the invention. In particular, each cache server 16 participating in the above-described scheme has to determine which other servers are in its neighborhood. In addition, on each routing tree T, a cache server 16 has to distinguish between upstream servers (located at parent nodes) and down stream servers (located at child nodes). A particular node, i, in the tree T is the parent of a node j, if i is the first cache server 16 on the route from j to the home server 20, in which case node j is also referred to as the child of node i.

One method for a cache server 16 to discover its neighborhood requires some assistance from the underlying router 14 and snooper 28. At selected times, the resource manager 24 asks the local router 14 to issue neighborhood discover messages to each destination in a routing table which the router 14 maintains.

These neighborhood discovery packets are then intercepted by a given snooper at another node having a cache server 16 in the tree. It is then responsibility of the intercepting cache server 16 to send a reply to the resource manager 24 at the cache server 16 that issued the neighborhood discover packet, announcing that it is a parent (e.g., that it is closer to the home server 20 than the issuing cache server) and the identity of the tree T that it is on. The destination port for neighborhood discover packets may be assigned an unlikely port number, to ensure that the destination home server 20 does not attempt to process un-intercepted neighborhood packets. A hop count field can also be used to limit neighborhood discover packets from excessive forwarding.

The main drawback of this approach is that it would flood the network with neighborhood discover packets. An alternative approach is to use document request message packets (i.e., the {SYN+GET} packets) that fly-by the filter in each cache server 16 anyway.

In this approach, each document request message contains a field identifying the previous hop, that becomes, under the scenario implemented above, an identification of the last cache server 16 that a particular request packet passed through.

As a request passes through a router 12 (i.e., it is not intercepted), the local snooper 28 stamps the IP address of the attached cache server 16. When a cache server 16 wants to discover its neighborhood, it then instructs its attached snooper 28 to extract the last observed destination and last hop address from request packets and then passes this information up to the local resource manager 24.

Figure 8:
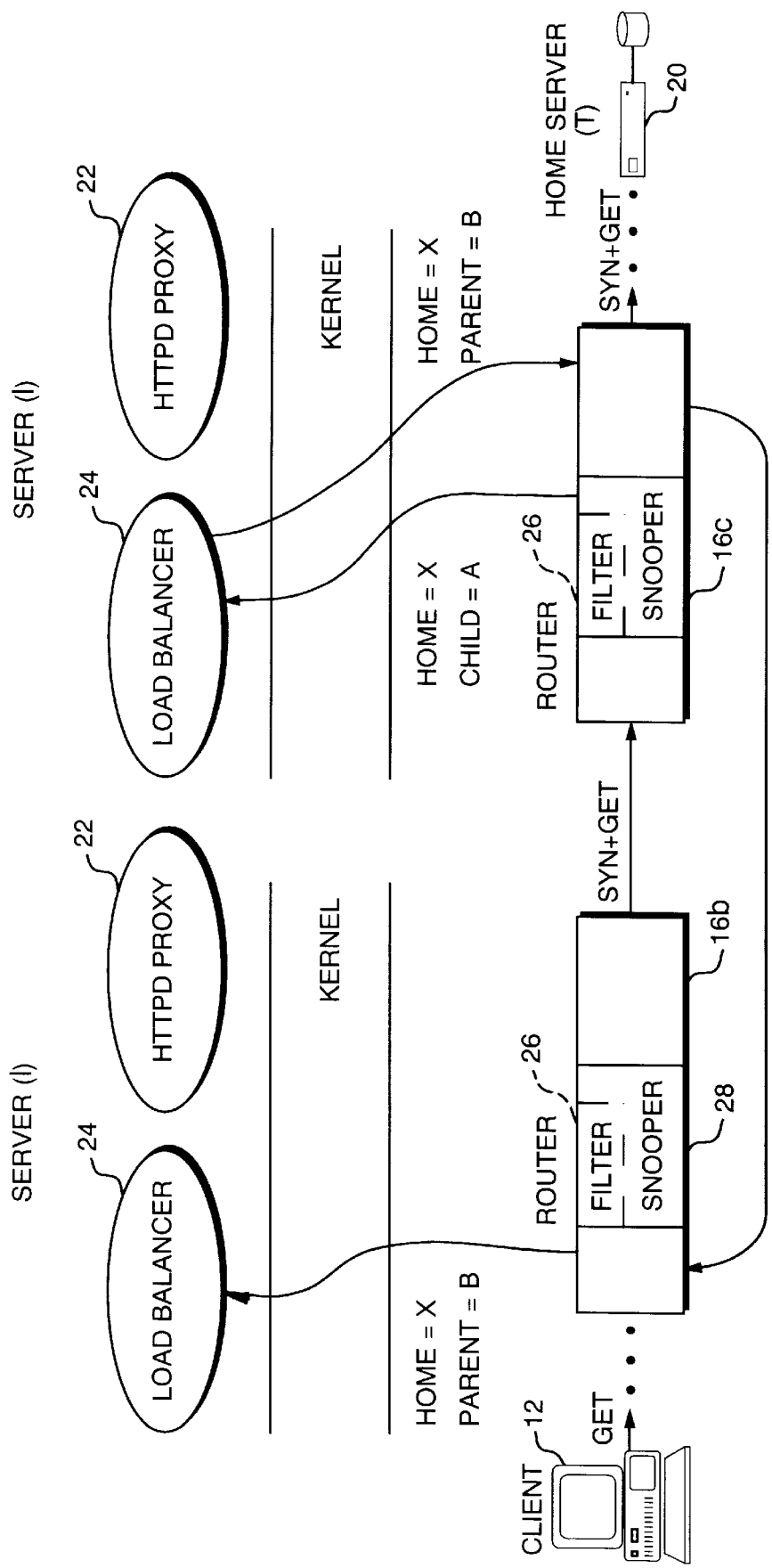
FIG. 8 also illustrates the interception of a document request message in more detail.

As shown in FIG. 8, a typical HTTP {GET} message follows a path from the client 12 through A to the home server 20 and is intercepted by intermediate cache 16c. While cache server 16c is processing the request, the path between the home server 20 and the client 12 changes causing all acknowledgments to use a different path.

Using this information the resource manager 24 at cache server 16c determines both which routing trees it is on and any down stream cache servers 16 on each tree. Once server 16c determines that server 16b is its downstream child on tree T, cache server 16c has to explicitly inform cache server 16b that it is its parent on T. To reduce the number of messages exchanged between the different components (snoopers 28 and resource managers 24), the snoopers 28 can cache a number of packets and forward them all at once to the resource managers 24.

Neighborhood information is maintained for a predetermined number, such as two, of neighborhood discovery epochs. If no requests are received through a child cache server 16b during these periods, the child cache server 16b is removed from the cache server 16c's model of the neighborhood. The parent cache server 16c then also informs the child cache server 16b of its intention to do so.

It is also possible that a cache server 16 does not have a parent snooper 28 on the routing tree to the home server 20. In this case, the snooper 28 at cache server 16b sends a neighborhood discovery packet in the direction of the home server 20. An upstream snooper such as the one at server 16c receives the packet and informs 16b that it is its parent on the tree to the home server 20. However, if the snooper 28 at 16b does not have a parent node such as 16c on the tree to home server 20 it replaces 16b address on the neighborhood discovery packet and forwards it in the direction of the home server 20.

This neighborhood discovery scheme has a number of advantages. First, the routing tree T does not have to be completely constructed for the caching protocol to start operating. Another advantage is that the cooperating cache servers 16 can dynamically discover and adapt to routing changes. Finally the protocol is totally distributed and is therefore robust against server failures.

4. Load Balancing

Unlike most other caching schemes, the caching scheme according to the invention requires distribution of cache copies to the cache servers 16 prior to clients actually requesting them. In other words, documents are moved among the cache servers 16 in anticipation of future document requests, rather than in direct response to any one particular document request message by the clients 12.

The above scheme of document caching and neighborhood discovery lends itself to a number of different types of such cache load distribution and/or load balancing objectives for both the cache servers 16 as well as the communication paths which interconnect them. In the preferred embodiment, this load distribution scheme attempts to avoid introducing an overhead that grows quickly with the size of the caching system, by using a diffusion based caching algorithm that relies strictly on local information.

In particular, the resource managers 24 create cache copies only when an upstream ("parent") node in the routing tree T detects a less loaded downstream ("child") node or link, to which it can shift some of its document service load by giving it a copy of one of its cached documents. "Load" herein can be a number of different performance criteria such as rate of request fulfillment, client response time, or fraction of time the server is busy.

An imbalance in the opposite direction causes a child node to delete some of its cached documents, or to otherwise reduce the fraction of requests for these documents that it wishes to serve.

Typically, documents which are the one being requested of parent nodes most often by a child node according to some measure are the documents which are directed to less loaded child nodes.

Similarly, when a cache server 16 must choose to drop documents from its local cache store 18, such documents are those typically being the least requested documents.

More particularly, when relegating load to a neighbor, a cache server 16 can push or release a document to a child or a parent, respectively. There are two goals with the present document caching by diffusion mechanism, which typically do not exist in traditional load diffusion processes. This is manifested in the need for the cache servers to determine which document to replicate, as well as to determine what fraction of document requests (i.e., load) should be relegated to an underloaded neighbor 30.

A first goal is to determine how a cache server selects a document to pass to an underloaded neighbor. An objective here is to extract the maximum capacity of all of the cache servers 16 in the network. A second objective is to reduce response time, by moving popular documents closer to clients and less popular documents away from clients, all by creating the least number of replicas. These goals are accomplished while also considering communication path load between cache servers 16.

To achieve these objectives, an overloaded cache server located at node i determines the least underloaded cache server at a child node j such that $$L_j \leq L_k \forall k \in C_i$$

where $L_j$ is the load at a particular cache server i, and Ci is the set of all cache servers. The overloaded cache server i pushes to the child j a fraction of the requests for the most popular document. Specifically, a document d is pushed from node i to node j if it has the following property $$P_{ji}(d) = \max_{g \in D_i} P_{ji}(g)$$

where Di is the set of documents cached at node i. In the other direction, a document d is released by node i to node j if $$P_{ji}(d) = \min_{g \in D_i} P_{ji}(g)$$

This policy is called max-min document diffusion, and it will satisfy the first two goals stated above.

A given cache can be viewed as a bin that is to be filled with documents in such a manner as to contribute the most to alleviating load. Thus, the larger the load associated with a given document, the smaller the number of documents that need to be placed in the particular cache. Max-min document diffusion provides a least number of documents in a cache to satisfy this third condition.

Having now determined which documents to diffuse, a cache server must also figure out how to change the fraction of requests that they intercept when relegating their load to a neighbor. This fraction can be determined by considering how a cache server pushes a fraction of the load imposed by a document. Specifically, assume that node i is the parent of node j and that i is overloaded with respect to j. Furthermore, assume that node i wishes to push a number of requests equal to $R_{ij}(d)$ of a total number of requests that it serves for document d to node j. If the total number of requests is defined as $$\beta_{ji}(d)\Delta_{ji}(d)$$

then the number of requests serviced by node i for document d is therefore given by $$P_{ii}(d) = \sum_{m \in C_i} \beta_{mi}(d)\Delta_{mi}(d)$$

and, after pushing $R_{ij}(d)$ requests to node j, node i will be serving a number of requests given by $$P'_{ii}(d) = \sum_{m \in C_i} \beta_{mi}(d)\Delta_{mi}(d) - \beta_{ji}(d)\Delta_{ji}(d) + \beta'_{mi}(d)\Delta'_{mi}(d)$$

where $$\Delta'_{ji}(d) = \Delta_{ji}(d) - R_{ij}(d)$$

and $\Delta_{ji}(d)$ represents the number of requests not intercepted by node j after the push to node j takes effect. Of $\Delta'_{ji}(d)$ the new fraction intercepted by node i is denoted by $\beta'_{ji}(d)$. Note also that $$R_{ij}(d) = \beta_{ji}(d) - \beta'_{ji}(d)\Delta'_{ji}(d)$$

Using the above values of $\Delta'_{ji}(d)$ and $R'_{ji}(d)$ it is straightforward to see that $$R_{ij}(d) = \beta_{ji}(d)\Delta_{ji}(d) - \beta'_{ji}(d)(\Delta_{ji}(d) - R_{ij}(d))$$

and by algebraic manipulation, that the new value of $$\beta'_{ji}(d) = \frac{\beta_{ji}(d)\Delta_{ji}(d) - R_{ji}(d)}{\Delta_{ji}(d) - R_{ij}(d)}$$

After computing the new fraction $\beta'_{ji}(d)$, node i updates its associated filter and forwards a copy of document d to node j, directing node j to increase the number of requests that node j intercepts by $R_{ij}(d)$.

Once node j receives this information it computes $$\beta'_{mj}(d) = \frac{R_{ij}}{\Delta_{ji}}(1 - \beta_{mj}(d)) + \beta_{mj}(d), \forall m \in C_j$$

and reflects these updates in its local filter code. To complete the analysis, note that the number of requests filtered by node j increases by $R_{ij}(d)$. It is also known that $$P'_{jj}(d) = \sum_{m \in C_j} \beta'_{mj}(d)\Delta_{mj}(d)$$

and, by substituting the new value of $\beta'_{mj}(d)$ one obtains $$P'_{jj}(d) = \sum_{m \in C_j} \left[ \frac{R_{ij}(d)}{\Delta_{ji}(d)}(1 - \beta_{mj}(d)) + \beta_{mj}(d) \right]\Delta_{mj}(d)$$

and by algebraic manipulation, that $$P'_{jj}(d) = \frac{R_{ij}(d)}{\Delta_{ji}(d)}\Delta_{ji}(d) + P_{jj}(d)$$
$$= P_{jj}(d) + R_{ij}(d)$$

thus completing the analysis.

With large documents, it may be advantageous for the local cache 18 to only include a portion of the requested document. In this event, the cache server can begin to provide the locally cached portion of the document to the client 12, while at the same time requesting the remainder of the document be sent by the home server 20.

Other criteria may include document size, document type, direction of transmission, or priority associated with particular documents.

The cache server 16 and router 12 may also make use of communication buffers in order to favor message traffic which is determined to have higher priority.

Related documents of the same types or which are recognized in some way by cache servers 16 as normally being requested together in close succession can be shifted between cache servers in the same operation.

Each cache server 16 is thus given the ability to cache and discard documents based upon its local load, its neighbors' loads, communication path load, and on document attributes such as popularity, size, cost to fetch, etc. In particular, each server maintains an estimate of the load at its neighbors and/or also transmits at various times, or "gossips" about its actual load to neighboring cache servers 16. If a cache server 16 notices that it is overloaded in some respect as compared to its neighbors, it relegates a fraction of its future predicted work to its less loaded child or parent neighbors as described above.

The invention thus also lends itself to load splitting, where neighbor ("sibling") nodes on the same path in the routing tree T for a given home server may share the request load for a particular document.

The above document diffusion algorithm may experience certain difficulties in optimized load distribution. In particular, a given cache server j can become a potential barrier to cache copies when it has at least two child cache servers k and k', and a parent cache server i, such that the load, L, on each server satisfies the expression:

$$L_k' \leq L_j \leq L_i \leq L_k$$

and cache server j does not cache any of the files required by its under-loaded child k.

Figure 9B:
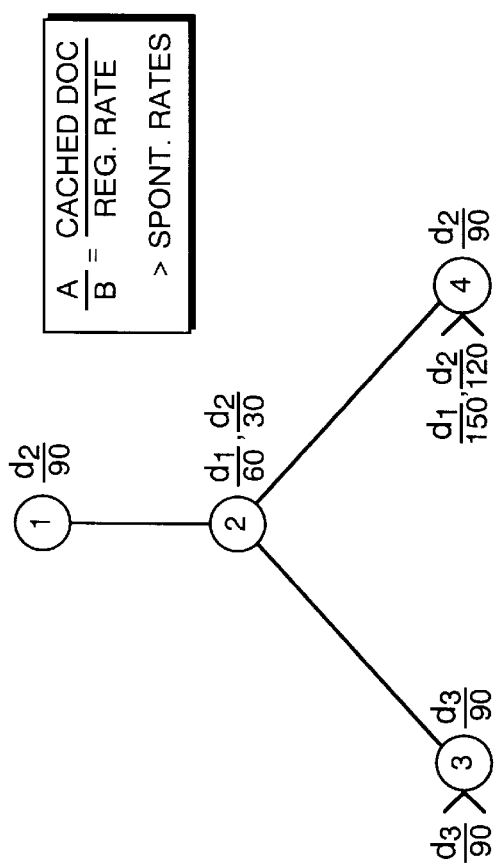
FIGS. 9($a$) and 9($b$) illustrate how diffusion can proceed in a worst case client request scenario.
Figure 9A:
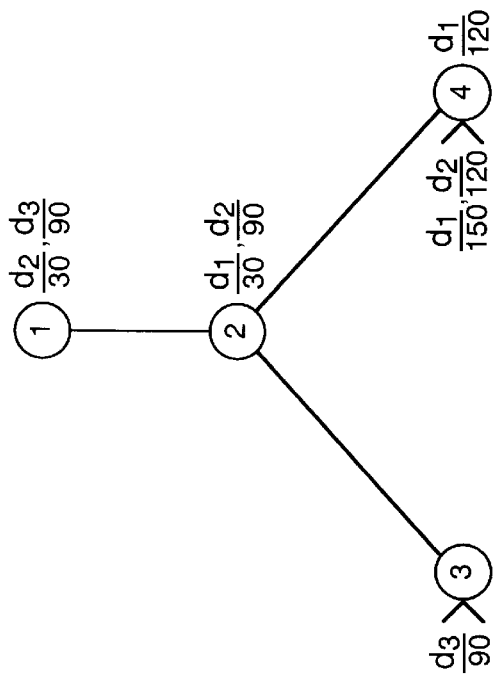

FIG. 9(a) illustrates an example of such a situation. The caching system consists of a home server 20 (at node number 1) and three intermediate servers 39 (as nodes 2, 3, and 4.) Requests are only being generated by the leaf nodes, in particular, documents d_1 and d_2 are being requested by node 4, and d_3 is being requested by node 3. The figure shows the placement of cache copies at particular nodes and the requests serviced by each cached copy.

In this example, the cache server 16 at node 2 is the potential barrier. It cannot diffuse any load to the cache server at node 3, since it does not cache d_3. In addition, the cache server 16 at node 2 isolates the cache server at node 1 from recognizing the existence of the problem.

One possible optimized load assignment would distribute the load evenly among all four nodes with each node servicing requests. FIG. 9(b) illustrates file cache and load distributions that would satisfy this condition.

The diffusion based scheme can be altered, however, so that a cache server 16 can detect such undesirable states as shown in FIG. 9(a) and recover from them. In particular, a cache server k can assume that its parent server j is a potential barrier if k remains under-loaded, relative to j , for more than a predetermined number of time epochs, such as two, without action taken by j to correct the under-loaded situation. In the example of FIG. 9(a), cache server k would correspond to node 3, with cache server j corresponding to node 2. Upon detecting a lack of diffused load from its parent node k, the child node can infer that the parent node does not cache any of the documents requested by the subtree rooted at k. Once copies of these documents are eventually served to it, the server k can then cache them normally. This technique is referred to as tunneling, because server k in this case is able to obtain and cache copies even in the presence of a parent node j which represents a high load barrier.

5. Other Features

The invention can be used to implement additional functionality in a network. These various functions are a direct result of the fact that the filter 26 located at the routers 14 can do more than simply divert requests for copies of documents to the local cache server 16.

For example, document popularity statistics are of necessity collected by the cache servers 16, in order to control the choice of which document to cache and in which cache server. The cache server 16 at each node keeps track of how many references to particular documents are coming in from where and knows an aggregate request amount.

This data can be collected at a central location, and arranged by groups of cache servers 16, such as by groups of cache servers 16 that are located in a particular network region. By collecting data in this fashion, it is then possible for the publisher of a document to not only obtain statistics about the "hit rate" on their material by specific clients, but also in which sub-portion of the network 10 the hits are coming from.

The invention also enables a type of accelerated distribution of documents into-the network 10 in anticipation of demand.

The cache servers 16 can also be used to host replicas of databases, search index files, and-other popular documents by acting as load splitters from the service provider perspective. In other words, database providers can arrange to have their documents placed into the network 10, pushing out data closer to the clients 12 that desire access to it, wherever these placements might be.

The cache servers may also implement authentication of the sources of request messages and other information. This can be done because the cache servers 16 automatically maintain information as to the client 12 which was the source of a particular document request message. If the client 12 is not among the authorized requesters for the document, the request message can be terminated at the cache server 16 before it even reaches the home server 20.

Selective security can also be provided for as well. The mechanism arises from the fact that the nodes each have a filter 26, a resource manager 24, a cache repository 18, and an HTTP proxy 22. The filter 26 may be used not only to keep track of how to redirect requests for cache copies to the HTTP proxy 22, but may also restrict access to the cache copies, such as by authenticating the request for the information. As long as the first and last hop along the path from the client 12 to the server 20 are trusted, since the links between the caches servers 16 can easily be arranged to be trusted links, a secure link can be provided between the clients 12 and the home server 20 via the cache servers 16.

More generically, the cache servers 16 may transform documents at several points during their distribution by the home server 20 and subsequent delivery to clients 12. Such transformations may enable and/or implement several features that add value to caching a document or program, including such features as compression or encryption of documents and/or programs. Furthermore, any known security techniques can be applied as transformations at the source, destination or both (in the case of a transaction). In addition to encryption and decryption, these include authentication, authorization (access control), non-repudiation, and integrity control. These security techniques can use cryptographic techniques that usually require a key, and optionally use the physical path to a cache server to strengthen authentication, authorization, and non-repudiation.

In typical applications, these transformations will be matched (e.g., for every encryption there should be a matching decryption) and used individually. However, they may also be composed at different points in the lifetime of a document. For example, a document may be compressed, encrypted, decrypted, and decompressed, all at different points.

Figure 10:
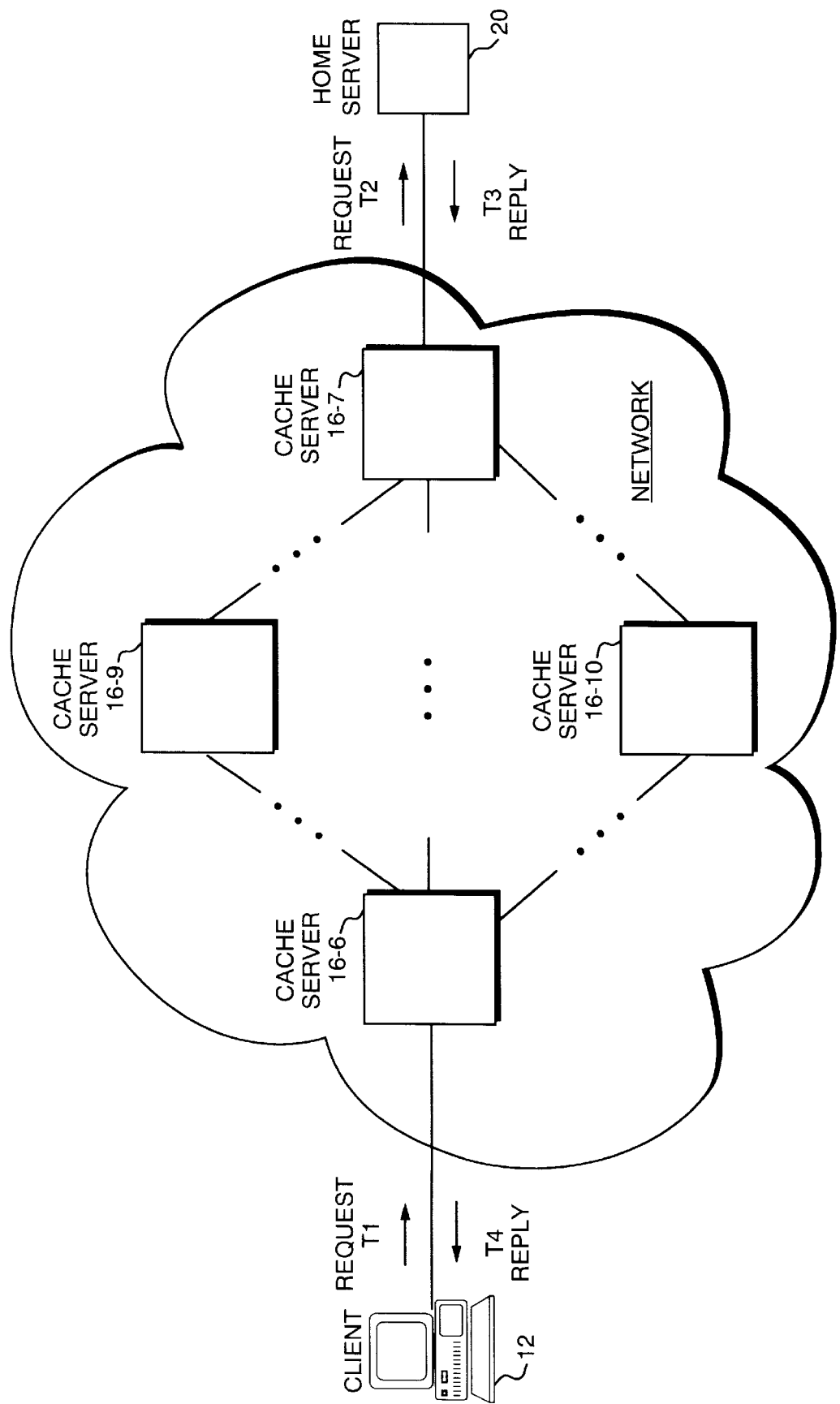
FIG. 10 illustrates how the cache servers may implement document transformation functions.

FIG. 10 illustrates one possible approach for applying transformations to documents. In this example, distinct transformations may occur at four different times as a document is distributed by the home server 20 and delivered to the client 12:

at time T1, as the request is made by the client 12 at time T2, as the request is forwarded to server 20 at time T3, as the reply is sent by the server 20 at time T4, as the reply is forwarded to the client 12

Note that even though the transformations in FIG. 10 are associated with four phases of communication, in reality, transformations are performed by the nodes themselves. Thus, T1 may be performed on the request by cache server 16-6 after it is received, or by client 12 before it is sent. In the former case, cache server 16-6 is performing the transformation. In the later case, the client 12 is performing the transformation, and merely tunneling this through cache server 16-6. Likewise, as the request is forwarded to the home server 20 the transformation T2 is performed by cache server 16-7 or home server 20. The same alternatives apply for T3 and T4, as the reply is sent from home server 20 and ultimately forwarded to client 12.

Where the transformations as performed in FIG. 10 have an important role is in key placement for security (or any other transformations which requires input other than the document). If the cache servers 16 themselves are implementing security, cryptographic keys must be distributed to the cache servers 16, as needed. In this case, end-to-end security can be provided by adding a secure channel between client 12 and cache server 16-6 as well as between cache server 16-7 and server home 20. If the client 12 and home server 20 implement their own end-to-end security the cache servers 16 do not hinder, and possibly cooperate in, distributing keys to the client 12 and home server 20.

FIG. 10 shows the cache servers 16-6 and 16-7 at the edges of the network, whereby there is a direct path between client 12 and cache server 16-6 as well as between cache server 16-7 and home server 20. However, the design as described does not preclude a more general configuration, when transformations are performed by intermediate cache servers 16-9 and 16-10. In other words, in FIG. 10 a transformation may be made at an intermediate cache server 16-9, 16-10 during the request, or reply, or both.

The scheme also allows for a form of transparent document compression, which is another form of conserving bandwidth, as long as a particular home server 20 and client 12 are committed to communicating by using cache servers 16. In particular, after the first hop along the path between the client 12 and the server 20, the first leaf node server 16-6 can implement compression or encryption in a manner which is transparent to both the client 12 and the home server 20.

Documents can also be virus-scanned or code-certified prior to being forwarded.

The invention also permits the efficient caching of dynamic content documents, where the end result of which data is actually returned to the client changes on the fly. Such documents may include, for example, documents having embedded Java code.

The cache servers 16 can accomplish efficient distribution of such dynamic content documents by caching not only the data for the document, but by also caching the programs that specify how the document is to be displayed when the data is retrieved. If the programs are of the type that are normally executed at the client 12 at the time of display of the documents, then the programs and the data are simply transferred to the client 12.

If, however, the programs are of the type which the client 12 expects will be running on the home server 20, the cache server 16 performs an additional level of home server spoofing by also running the programs. In this instance, it may be necessary for the cache server 16 to maintain an interactive session state with the client 12 in order to complete the spoofing of the home server 20.

The invention also inherently improves the delivery of stored media such as audio and video data files since number of hops between a home server 20 and a client 12 are reduced.

While we have shown and described several embodiments in accordance with the present invention, it is to be understood that the invention is not limited thereto, but is susceptible to numerous changes and modifications as known to a person skilled in the art and we therefore do not wish to be limited to the details shown and described herein but intend to cover all such changes and modifications as are obvious to one of ordinary skill in the art.

What is claimed is:

1. In a system containing a plurality of computers which communicate over a network using communication protocols, with the computers at certain nodes in the network acting as home servers for storing information in the form of documents, and with certain other computers acting as clients that send document request messages to the servers at an application layer, the document requests message being requests for documents stored at the home servers, a method of fulfilling document request messages comprising the steps of:

(a) storing local cache copies of documents at a plurality of intermediate node locations in the network; and (b) in response to a particular one of the clients generating a particular application layer document request message addressed to a particular one of the home servers, attempting to fulfill the particular application layer document request message at one of the intermediate node locations by, at a selected communication layer lower than the application layer, (i) intercepting the document request message at an intermediate node location through which the document request naturally travels, the intermediate node being located along a path through the network from the client towards the home server, the path being a route from the client to the home server as determined by the home server address, and corresponding to an identical path that the message would travel through the network in the absence of any cache copies being stored at intermediate node locations; and (ii) returning one of the local cache copies to the application layer at the client, such that the application layer request message is intercepted by the lower layer at the intermediate node and such that the application layer on the server does not receive application layer document request message.

2. A method as in claim 1 additionally comprising the step of, at selected intermediate nodes:

(c) if a particular document request message cannot be fulfilled by providing one of the local cache copies, forwarding the request message towards the home server along the path by continuing to address the request message to the particular home server.

3. A method as in claim 1 wherein the step of fulfilling the particular document request additionally comprises, in at least one intermediate node, wherein the intermediate node is neither a client nor a home server, the step of:

(c) storing local cache copies of particular documents which are also stored on other intermediate nodes;

(d) determining the identity of a neighboring intermediate node that stores local cache copies; and (e) allocating the fulfillment of document request messages among the intermediate node and the neighboring intermediate node based upon the availability of document request message load fulfillment resources at the intermediate node.

4. A method as in claim 3 wherein the message load fulfillment resources include the caches.

5. A method as in claim 3 wherein the message load fulfillment resources include communication path load.

6. A method as in claim 3 in which the step of allocating the fulfillment of document request messages additionally comprises the step of:

(f) exchanging status messages between the intermediate node and the neighboring node, the status messages including information selected from at least one of processing load, communication path load, document size, document request message response time, document request message request rate, document request message rate of change, or home server operability.

7. A method as in claim 1 wherein the step of fulfilling the particular document request additionally performs communication path load distribution between paths that interconnect the nodes, by further comprising the steps of:
   (c) storing local cache copies of particular documents which are also stored on other nodes;
   (d) determining the identity of a neighboring node that stores local cache copies; and
   (e) allocating the fulfillment of document request messages among the intermediate node and the neighboring intermediate node based upon the communication path load.

8. A method as in claim 2 additionally comprising the steps of, at selected intermediate nodes:
   (d) determining an identity of a first neighboring node from which a particular document request message is received; and
   (e) determining an identity of a second neighboring node to which a particular document request message is routed on the path to the home server if the particular document request message cannot be fulfilled by returning the local cache copy to the client.

9. A method as in claim 8 wherein the step of storing local cache copies further comprises the step of:
   (f) determining a node state parameter at the first neighboring node and a node state parameter at the local node, and when the first neighboring node and local node state parameters are different by a predetermined amount from one another, forwarding a copy of at least one of the local cache copies to the first neighboring node for storing at the first neighboring node location.

10. A method as in claim 9 wherein the node state parameters are selected from the group consisting of rate of request fulfillment, change in rate of request fulfillment, document size, document fetch response time, communication path load, cache server load, or home server operational status.

11. A method as in claim 8 wherein the step of storing local cache copies further comprises the step of:
   (f) determining a node state parameter at the second neighboring node and a node state parameter at a local node, and when the node state parameters at the second neighboring node and local node differ by a predetermined amount, deleting at least one of the local cache copies.

12. A method as in claim 11 wherein the node state parameters are selected from the group consisting of rate of request fulfillment, change in rate of request fulfillment, document size, document fetch response time, communication path load, cache server load, or home server operational status.

13. A method as in claim 8 wherein the step of storing local cache copies further comprises the step of:
   (f) determining a node state parameter at the second neighboring node and a node state parameter at a local node, and when the node state parameters at the second neighboring node and local node different by a predetermined amount, in the step of fulfilling, reducing a proportion of the document requests that are fulfilled by providing local cache copies to the client.

14. A method as in claim 1 wherein the step of fulfilling additionally comprises the step of:
   (c) returning the local cache copy to the client if a local node state parameter differs from a predetermined amount.

15. A method as in claim 1 additionally comprising the step of, at the selected intermediate nodes:
   (c) recording load statistics as to the number of request messages fulfilled by providing one of the local cache copies to the client.

16. A method as in claim 1 additionally comprising the step of, at the selected intermediate nodes:
   (c) recording request message statistics as to the number of request messages received and fulfilled for a particular document.

17. A method as in claim 1 additionally comprising the step of, at the selected intermediate nodes:
   (c) recording response time statistics as to the number of request messages received for documents stored at a particular home server.

18. A method as in claim 1 wherein document request messages are received at the intermediate nodes on a plurality of communication paths, and the method additionally comprises the step of, at the selected intermediate nodes:
   (c) recording request message statistics to track which document request messages are received from a particular path.

19. A method as in claim 1 wherein document request messages are received at the intermediate nodes on a plurality of communication paths, and the method additionally forecasts communication path usage by criteria selected from one of overall network demand, network regional demand, or by specific client demand.

20. A method as in claim 1 wherein the step of fulfilling document request messages additionally comprises the step of:
   (c) authenticating a node over which a document request message arrives from a client, prior to forwarding the document request message.

21. A method as in claim 1 wherein the step of fulfilling document request messages additionally comprises the step of:
   (c) authenticating a node from which the cached document originated prior to returning the local cache copy to the client.

22. A method as in claim 1 wherein the home servers also store programs for operating on the documents, and step (b) additionally comprises the step of, at the intermediate node:
   (c) storing local cache copies of selected programs as certain selected programs related to requested document copies are obtained from the home servers.

23. A method as in claim 22 additionally comprising the step of:
   (d) executing the local cache copies of selected programs at the intermediate nodes upon demand from the client.

24. A method as in claim 22 additionally comprising the step of:
   (d) maintaining an interactive session between the intermediate node and the client such that the intermediate node acts as the home server would act in the event that the home server had fulfilled the document request message.

25. (Amended) A method as in claim 1 wherein the step of fulfilling the document request message additionally comprising the step of:
   (c) applying selected programs to the local cache copies to obtain results, prior to returning the results of applying the programs to the client.

26. A method as in claim 1 wherein the documents are selected from the group of multimedia documents, programs, data bases, compressed data, or encrypted data.

27. A method as in claim 8 wherein multiple intermediate nodes are located between the home server and the client, and wherein a particular document is pushed into the network by routing it to a plurality of nodes depending upon an expected rate of demand upon the document.

28. A method as in claim 9 wherein the predetermined rate of request fulfillment depends upon document attributes selected from the group of expected rate of request fulfillment, expected change in rate of request fulfillment, document size, expected document fetch response time, expected communication path load, or expected cache server load.

29. A method as in claim 1 additionally comprising the step of, at the intermediate nodes,
(c) storing, with the local cache copies, data indicating a condition as to the release of the local cache copies; and
(d) returning the local cache copy to the client only when the condition is satisfied.

30. A method as in claim 29 wherein the condition is a time of release of the document.

31. A method as in claim 1 wherein the step of storing cache copies is selectively executed based upon predetermined conditional criteria.

32. A method as in claim 31 wherein the predetermined conditional criteria include time of day.

33. A method as in claim 31 wherein the predetermined conditional criteria is at least one selected from the group of document size, desired document request message response time, document request message rate, rate of change of the document request message rate, cache server load, communication path load, or home server operational status.

34. A method as in claim 1 wherein the step of storing cache copies additionally comprises the step of storing a partial copy of a document which is larger than a predetermined size.

35. A method as in claim 1 additionally comprising the step of:
(c) deleting cache copies of documents selectively executed based upon predetermined conditional criteria.

36. A method as in claim 35 wherein the predetermined conditional criteria include time of day.

37. A method as in claim 35 wherein the predetermined conditional criteria is at least one selected from the group of document size, desired document request message response time, document request message rate, rate of change of the document request message rate, cache server load, or communication path load.

38. A method as in claim 1 additionally comprising the steps of, to maintain cache consistency:
(c) at the home server, attaching a document expiration time stamp to the document;
(d) at an intermediate node, examining the time stamps attached to a cached document to determine if the document has expired; and
(e) if the cached document has expired, either deleting or refreshing it.

39. A method as in claim 1 additionally comprising the steps of:
(c) at the home server, attaching a document modification time stamp to the document; and
(d) at an intermediate node, estimating the modification rate of the document, and if the document modification rate is greater than the request rate by a predetermined amount, deleting the cache copy, and if the modification rate is less than the request rate by a predetermined amount, requesting an updated cache copy.

40. In a system containing a plurality of computers which communicate over a network using a layered communication protocol, with the computers at certain nodes in the network acting as home servers for storing information in the form of documents, and with certain other computers acting as clients that send document request messages to the servers at an application layer level, the document request messages being requests for documents stored at the home servers, a method of fulfilling document request messages by transparent proxying comprising the steps of:
(a) storing local cache copies of documents at a plurality of intermediate node locations in the network; and
(b) in response to a particular one of the clients generating a particular application layer document request message intended to be sent to a particular one of the home servers, fulfilling the particular application layer document request message at one of the intermediate node locations along a path from the client to the home server through which the document request would naturally flow in the absence of any cache servers, by intercepting the document request message and returning one of the local cache copies in a response message to the application layer at the client, such that the application layer request message is intercepted at the intermediate node and such that a network connection is not established with the application layer on the home server and such that the addresses in a response message are the same as if the home server had fulfilled the document request message.

41. A method as in claim 40 wherein an intermediate node comprises a cache server and a router, additionally comprising the steps of, at the router:
(c) recognizing document request messages that are to in be intercepted, and extracting such messages for processing by the cache server.

42. A method as in claim 1 additionally comprising the steps of:
(c) simultaneously pre-fetching related documents together, wherein related documents are those documents that are most frequently requested in close succession.

43. A method as in claim 1 additionally comprising the steps of: at the client,
(c) generating a connection request message which requests a communication path to be established between the client and a home server; and at an intermediate node,
(d) upon receiving a connection request message from the client, waiting for the receipt of a document request message, and forwarding the connection request message and the document request message together addressed to the home server.

44. A method as in claim 43 additionally comprising the steps of:
at an intermediate node which caches the document indicated by the request message,
(e) acknowledging the connection request to the client, and returning the requested document to the client.

45. A method as in claim 1 additionally comprising the step of:
(c) operating a cache server which selects documents to store in a local cache and documents to remove from the local cache, such that the cache server selects a most often requested document to replicate at a neighboring cache server located at a node in the path, and chooses the least often requested documents to drop from its own memory.

46. A method as in claim 1 wherein each intermediate node includes a resource manager associated with it, and the resource manager performs the steps of:

(c) allocating the use of communication buffers to buffer incoming and outgoing messages so as to favor message traffic that is designated as more important.

47. A method as in claim 46 comprising the steps of:

(d) allocating the use of the communication buffers and communication path bandwidth based upon content attributes selected from the set of document size, document type, direction of transmission, or priority.

48. A method as in claim 1 additionally comprising the steps of, at the intermediate nodes, (c) comparing a node state parameter at the intermediate node with a node state parameter at a neighboring cache server; and (d) if the node state parameters at the neighboring cache server and the intermediate node differ by a predetermined amount for more than a predetermined period of time, at the intermediate node, inferring that the neighboring cache server does not cache one or more documents being served by the intermediate node.

49. A method as in claim 48 wherein the node state parameters are selected from the group consisting of rate of request fulfillment, change in rate of request fulfillment, document size, document fetch response time, communication path load, home server operability, or cache server load.

50. In a system containing a plurality of computers which communicate over a network, with certain computers acting as home servers for storing information in the form of documents, and with certain other computers acting as clients that send messages which are requests for documents stored at the home servers, a method of fulfilling document request messages by distributed caching comprising the steps of:

(a) routing document request messages from a client to a home server along a path from the client to the home server, the path comprising a plurality of hops including a plurality of intermediate node locations in the network through which the document request would naturally flow through in the network in the absence of cache servers;

(b) at selected intermediate nodes,
  (i) storing local cache copies of selected documents at intermediate nodes;
  (ii) filtering document request messages to determine if a particular document request message made by a client can be fulfilled by providing one of the local cache copies to the client, and if so, returning the local cache copy to the client; and
  (iii) if not possible to so fulfill the document request message forwarding the document request message to the home server along the path which the document request message would naturally follow through the network.

51. In a system containing a plurality of computers which communicate over a network, with the computers at certain nodes in the network acting as home servers for storing information in the form of documents, and with certain other computers acting as clients that send document request messages which are requests for documents stored at the home servers, a method of fulfilling document request messages at node through which the document request messages travel comprising the steps of:

(a) storing local cache copies of documents at a plurality of intermediate node locations in the network;

(b) in response to a particular one of the clients generating a particular document request message intended to be sent to a particular one of the home servers;

(i) determining a path for the particular document request message to travel from the particular client to the particular home server along a path of nodes located in the network between the particular client and the particular home server, the path being determined by an address of the home server and the path comprising a plurality of the intermediate node locations in the network;

(ii) forwarding the request message along the path as determined by the home server address in the request message; and (iii) fulfilling the particular document request message at one of the plurality of intermediate node locations in the determined path of nodes by the steps of, if a local cache copy is available at the intermediate node, returning one of the local cache copies corresponding to a document specified in the particular document request message, and otherwise if a local cache copy is not available at the intermediate node, forwarding the request message in the direction of the home server along the path.

52. A method as in claim 51 additionally comprising the step of:

(c) at the intermediate node locations, coordinating the step of storing cache copies and splitting document fulfillment among the intermediate node locations to distribute document request load on the intermediate node cache servers or home server.

53. A method as in claim 51 additionally comprising the step of:

(c) at the intermediate node locations, coordinating the step of storing cache copies and splitting document fulfillment among the intermediate node locations to distribute communication path load.

54. A method as in claim 51 wherein the step of coordinating the step of storing cache copies among the intermediate node locations to reduce document load comprises the steps of:

(c) at neighboring node locations, replicating documents.

55. A method as in claim 51 wherein the step of storing copies of documents at intermediate node locations additionally comprises the step of:

(c) alternatively making such copies available or not available for fulfilling document requests based upon predetermined criteria.

56. A method as in claim 55 wherein the predetermined criteria is time of day.

57. A method as in claim 51 wherein the step of fulfilling the particular document request message at one of the intermediate servers additionally comprises the steps of:

(c) if the leaf node does not store the requested document opening a communication connection between the leaf node and the next intermediate node by sending a connection request message addressed to the home server that is intercepted by the next intermediate node server, the leaf node being one of the intermediate node locations that initially receives the document request message from the client; and (d) forwarding the document request and the communication connection to another intermediate node that is located closer to the home server in the network than the leaf node.

58. A method as in claim 51 wherein the step of fulfilling the particular document request message at one of the intermediate servers additionally comprises the steps of:

(c) opening a communication connection between a leaf node and the home server, the leaf node being one of the intermediate node locations that initially receives the document request message from the client; and (d) relaying the document request to another intermediate node that is located closer to the home server in the network than the leaf node.

59. A method as in claim 51 wherein the cache servers additionally perform the steps of:

(c) acting as a communication proxy for the home server from the perspective of the client.

60. A method as in claim 50 wherein the step of filtering document request messages additionally controls access to documents, and the method additionally comprises the step of:

(c) filtering document request messages based upon a Uniform Resource Locator (URL) field in the document request message.

61. A method as in claim 50 wherein the step of filtering document request messages additionally controls access to documents, and the method additionally comprises the step of:

(c) filtering document request messages based upon an authentication field in the document request message.

62. A method as in claim 51 wherein the step of returning the cache copy of the document to the client additionally comprises the step of:

(c) virus scanning the document.

63. A method as in claim 51 wherein the step of returning the cache copy of the document to the client additionally comprises the step of:

(c) code certifying the document.

64. A method as in claim 51 wherein the step of returning the cache copy of the document to the client additionally comprises the step of:

(c) decoding the document.

65. A method as in claim 51 wherein the step of returning the cache copy of the document to the client additionally comprises the step of:

(c) controlling access to the cache copy of the document based upon client authentication and home server request.

66. A method of fulfilling requests for information in a network of computers, with at least some of the computers in the network acting as home servers for storing information, and at least some of the computers acting as clients that send request messages to the home servers, the method comprising the steps of:

(a) distributing cache copies of the information through the network by storing copies of the information in a plurality of computers in the network that act as cache servers;

(b) routing request messages from the client to the home server along a path consisting of a plurality of intermediate computers in the network, the path including computers through which the request messages travel in the absence of any cache servers with at least some of the intermediate computers also acting as cache servers, the request messages initiated by a particular one of the clients to obtain information from a particular one of the home servers; and (c) transparently processing request messages as they are routed through the cache servers, such that request messages that can serviced by the cache servers instead of the home servers are serviced by the cache servers, in a manner which is transparent to the clients and the home servers.

67. A method as in claim 57 additionally comprising the step of:

(d) automatically moving cache copies among the cache servers in the network in response to predetermined criteria concerning the servicing of the request messages by the cache servers.

68. A method as in claim 1 wherein the multimedia documents contain digitized information selected from the group of text, graphics, audio, video, programs, or other data.

69. A method as in claim 1 wherein the network comprises a wireless network.

70. A method as in claim 1 wherein the intermediate nodes also perform the step of:

determining if a particular communication entity has failed, and if so, notifying another network entity.

71. A method as in claim 70 wherein the communication entity is one of a router, communication path, or communication path.

72. A method as in claim 70 wherein the other network entity is one of another intermediate node, a network administrator, or other networked computer system.

73. A method as in claim 55 wherein the predetermined criteria is a notification by the client.

74. A method as in claim 55 wherein the predetermined criteria is a notification by the home server.

75. A method as in claim 2 additionally comprising the steps of, at selected intermediate nodes:

(d) determining an identity of a first neighboring node from which a particular document request message is received; and (e) determining an identity of a second neighboring node to which a particular document request message is routed on the path to the home server;

(f) if the particular document request message cannot be fulfilled satisfactorily by the intermediate node because of failed or slow processing at the intermediate node, altering the path to bypass the intermediate node.

* * * * *